United States Patent
Barsotti

(10) Patent No.: US 8,181,877 B2
(45) Date of Patent: May 22, 2012

(54) AIMING DEVICE

(75) Inventor: Stefano Barsotti, San Giuliano Terme (IT)

(73) Assignee: Datalogic Scanning Group S.r.l., Lippo di Calderara di Reno (IT)

(*) Notice: Subject to any disclaimer, the term of this patent is extended or adjusted under 35 U.S.C. 154(b) by 412 days.

(21) Appl. No.: 12/519,087

(22) PCT Filed: Dec. 18, 2006

(86) PCT No.: PCT/IB2006/003689
§ 371 (c)(1), (2), (4) Date: Jun. 12, 2009

(87) PCT Pub. No.: WO03/102630
PCT Pub. Date: Dec. 11, 2003

(65) Prior Publication Data
US 2010/0059592 A1    Mar. 11, 2010

(51) Int. Cl.
*G06K 7/10* (2006.01)
*G06K 9/24* (2006.01)

(52) U.S. Cl. .............. 235/462.2; 235/375; 235/462.22

(58) Field of Classification Search .............. 235/462.2, 235/462.32, 462.45, 375
See application file for complete search history.

(56) References Cited

U.S. PATENT DOCUMENTS

| 7,075,663 B2 * | 7/2006 | Canini et al. ............... 356/614 |
| 2006/0239006 A1 | 10/2006 | Chaves et al. |
| 2007/0108284 A1 * | 5/2007 | Pankow et al. ............... 235/454 |

FOREIGN PATENT DOCUMENTS

| CH | 617769 A5 | 6/1980 |
| CN | 1659459 A | 5/2003 |
| EP | 0997760 A1 | 5/2000 |
| WO | WO 03/102630 A2 | 12/2003 |
| WO | 2006/088141 A | 8/2006 |

OTHER PUBLICATIONS

Office Action dated Jul. 1, 2011 in counterpart European Patent Application No. 06842251.8, 6 pages.
English Language Translation of Office Action issued by the Chinese Patent Office on Nov. 1, 2010, in corresponding Chinese Patent Application No. 200680056675.1.
International Search Report from PCT/IB2006/003689 dated Oct. 18, 2007.

* cited by examiner

*Primary Examiner* — Edwyn Labaze
(74) *Attorney, Agent, or Firm* — Duane Morris LLP

(57) ABSTRACT

An aiming device for an image acquisition apparatus includes light emitting means and a light guide arranged for receiving a luminous radiation generated by the light emitting means and for providing reference image means in an aiming zone, the light guide including consecutive portions of light guide defining preferential directions of passage for the luminous radiation, each portion of light guide being inclined with respect to an adjacent portion of light guide.

47 Claims, 19 Drawing Sheets

AIMING DEVICE

FIELD OF THE INVENTION

The invention concerns an aiming device, in particular an aiming device that can be associated with an apparatus for image acquisition, such as, for example, an apparatus for reading optical information.

BACKGROUND OF THE INVENTION

The expression "optical information" is used in this description and in the following claims to indicate any graphic representation having the function of storing a piece of information, whether coded or uncoded. A particular example of optical information is given by linear or two-dimensional optical codes, in which the information is coded by means of appropriate combinations of elements of preset form, for examples squares, rectangles or hexagons, of a dark colour, (usually black) separated by light elements (spaces, usually white), such as bar codes, stacked codes and two-dimensional codes in general, colour codes, etc. More in general the term "optical information" further comprises other graphic forms, including printed characters (letters, numbers, etc.) and particular patterns (such as stamps, logo-types, signatures, fingerprints etc.). The term "optical information" comprises graphic representations detectable across the whole range of wavelengths, between infrared and ultraviolet, and thus not limited to the field of visible light.

In the present description and in the following claims the expression "apparatus for image acquisition" means a fixed or portable apparatus capable of acquiring images of objects or people, of subjects in general, and in particular of optical information, by means of a plurality of possible acquisition techniques.

For example, acquisition can take place by illuminating a subject, collecting with a suitable optical receiving system the light diffused by the object on a sensor consisting of an array of light-sensitive elements of a linear or matrix type, for example of the CCD or C-MOS type, and generating an image signal by means of an integrated or separate electronic system associated to the sensor. The image signal, generated in analog or digital form, can then be processed by the same apparatus or in a separate image processing system.

Typically, in apparatuses for reading coded optical information, such as bar codes, the image signal in digital form is decoded to extract the content information of the code.

Apparatuses of this type are known as linear or matrix TV cameras or cameras, and when they read optical information, they are also known as code-reading devices of the "imager" type.

According to another technique, the acquisition can be performed by illuminating a subject by scanning with one or more laser beams, by collecting the light diffused or reflected by the subject upon one or more photodiodes using an optical receiving system, and by generating, using a dedicated electronics, an electric image signal representing the diffusion/reflection of each point of the object that was struck by the laser beam during scanning. This signal is then processed and, in particular for apparatuses that read coded optical information, is digitalised and decoded. Apparatuses of this type are generally known as "laser scanners". Instead of capturing an image with a single simultaneous acquisition of all the light-sensitive elements ("in parallel"), as in TV cameras and "imager" reading devices, "laser scanners" capture the image of the object sequentially during the scanning process, one instant after another ("in series"). Optical code readers, for example two-dimensional optical codes (Datamatrix, QR, PDF, Maxicode, etc.), in particular readers of the "imager" type with matrix sensors, are provided with aiming devices which as accurately as possible indicate to a user the Field of View (FoV) of the reader, that is, the framed area as the distance between the reader and the optical code varies. In particular, it is preferable that the area aimed by the aiming device (aiming area) is always included within the area actually framed. In this way, the user can be certain that if the optical code to be read is situated within the aiming area, it is indeed framed by the reader.

Readers of the "laser scanner" type, especially those that use lasers with non-visible wavelengths, can also comprise aiming devices capable of indicating to the user the zone where scanning is performed.

EP 0997760 describes an aiming device for an optical information reader comprising two lighting units, each of which comprising a light source, for example a LED, or a lamp, and a V-shaped light guide, arranged downstream of the respective light source in order to generate a pair of optical emission paths. Each V-shaped light guide comprises a pair of branches arranged at a predetermined angle. Furthermore, the light sources can be suitably inclined relative to a reading plane containing the optical information.

As a result, the above-described aiming device generates four light beams defining on the reading plane vertices of a quadrilateral, which provides the user with a visual indication of a reading zone framed by the optical information reader.

A drawback of the above-described aiming device is that a part of the light beam entering the V-shaped light guide of the aiming device escapes from it through the portion located where the light guide branches intersect.

This part of the light beam produces an indefinite image on the reading plane, which image is thus added to the reference images produced by further portions of light beam that have traversed the branches of the V-shaped light guide and exit from these branches. In other words, the above-mentioned part of luminous beam creates a disturbance which not only prevents accurate indication of the reading zone framed by the optical information reader, but it can even cause confusion relative to the extension and position of the reading zone for an operator using the optical information reader.

Only the light rays emitted by the light source, which have a substantially parallel direction to one of the branches of the V-shaped light guide contribute to forming the above-mentioned further portions of light ray, and consequently the reference images on the reading plane. All the other light rays emitted by the light source follow an uncontrolled path within the light guide and can leave the light guide in equally uncontrolled directions, forming the indefinite image referred to above. In addition, the quantity of these rays that are substantially parallel to one of the branches of the guide is very small, or even negligible, compared to the total number of rays emitted by the source, so that it is difficult for an operator to identify visually the above-mentioned reference images on the reading plane.

SUMMARY OF THE INVENTION

An object of the invention is to improve aiming devices for image acquisition apparatuses, in particular for apparatuses for reading optical information.

A further object is to obtain an aiming device for image acquisition apparatuses that provides very clear and undisturbed reference images.

A further object of the invention is to obtain an aiming device for image acquisition apparatuses comprising a light guide in which substantially all the luminous radiation entering the light guide contributes to defining reference images that facilitate the identification of an area framed by the image acquisition apparatus.

In a first aspect of the invention, an aiming device is provided for an image acquisition apparatus, comprising light-emitting means and a light guide arranged for receiving a luminous radiation generated by said light-emitting means and for providing reference image means in an aiming zone, characterised in that said light guide comprises consecutive portions of light guide defining preferential directions of passage of said luminous radiation, each portion of light guide being inclined with respect to an adjacent portion of light guide.

Owing to this aspect of the invention, an aiming device can be obtained in which the luminous radiation advances within the light guide along a non-rectilinear path. In this way, the aiming device can emit the reference image means using emitting surface means of the light guide, positioned in any position whatsoever relative to the light source means.

In an embodiment, a reflection surface is interposed between adjacent portions of the light guide.

In another embodiment, the radiation entering the light guide can be in the form of a collimated luminous beam.

It is therefore possible to obtain an aiming device wherein there is a reduced risk that portions of luminous radiation beyond those forming the reference image means will escape from the light guide, that is, portions of luminous radiation that could create a disturbance in the aiming zone.

In particular, substantially all the luminous radiation entering the light guide contributes to defining the reference image means.

In this way, since there is no significant dispersion of luminous radiation, the reference image means will be brighter, power of light emitting means being equal.

In a still further embodiment, the light guide comprises a plurality of branches and the light emitting means comprises a single source of light.

In this case, a very economical aiming device can be obtained, since one single light source generates a plurality of reference images.

In particular, the light guide can comprise five branches, four branches arranged for generating reference images positioned at the vertices of a quadrilateral and a fifth branch arranged for generating a reference image positioned in proximity of a centre of said quadrilateral.

In a second aspect of the invention, an aiming device is provided for an image acquisition apparatus comprising light-emitting means and a light guide arranged for receiving a luminous radiation generated by said light-emitting means and for providing a plurality of reference images in an aiming zone, characterised in that said light guide comprises at least three branches, each of which emits a luminous beam arranged for generating a corresponding reference image of said plurality of reference images.

Owing to this aspect of the invention, it is possible to obtain a plurality of reference images using a single light source.

The aiming pattern—since it is identified by at least three distinct reference images—provides a user with a highly accurate indication.

BRIEF DESCRIPTION OF THE DRAWINGS

The invention will be better understood and carried into effect with reference to the attached drawings, in which some embodiments are shown by way of non-limiting example, in which.

DETAILED DESCRIPTION

Figure 1:
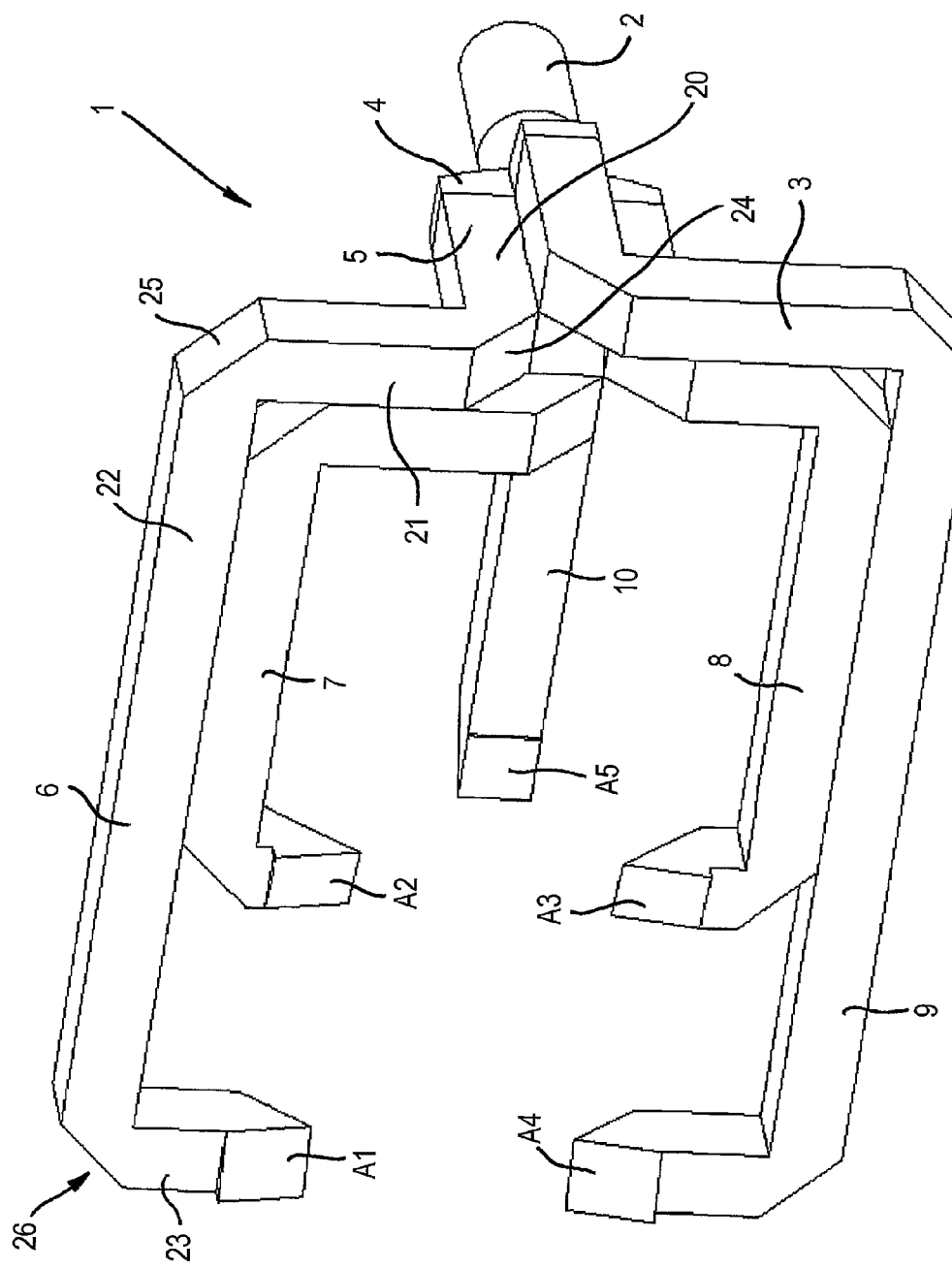
FIG. 1 is a perspective front view of the aiming device.
Figure 2:
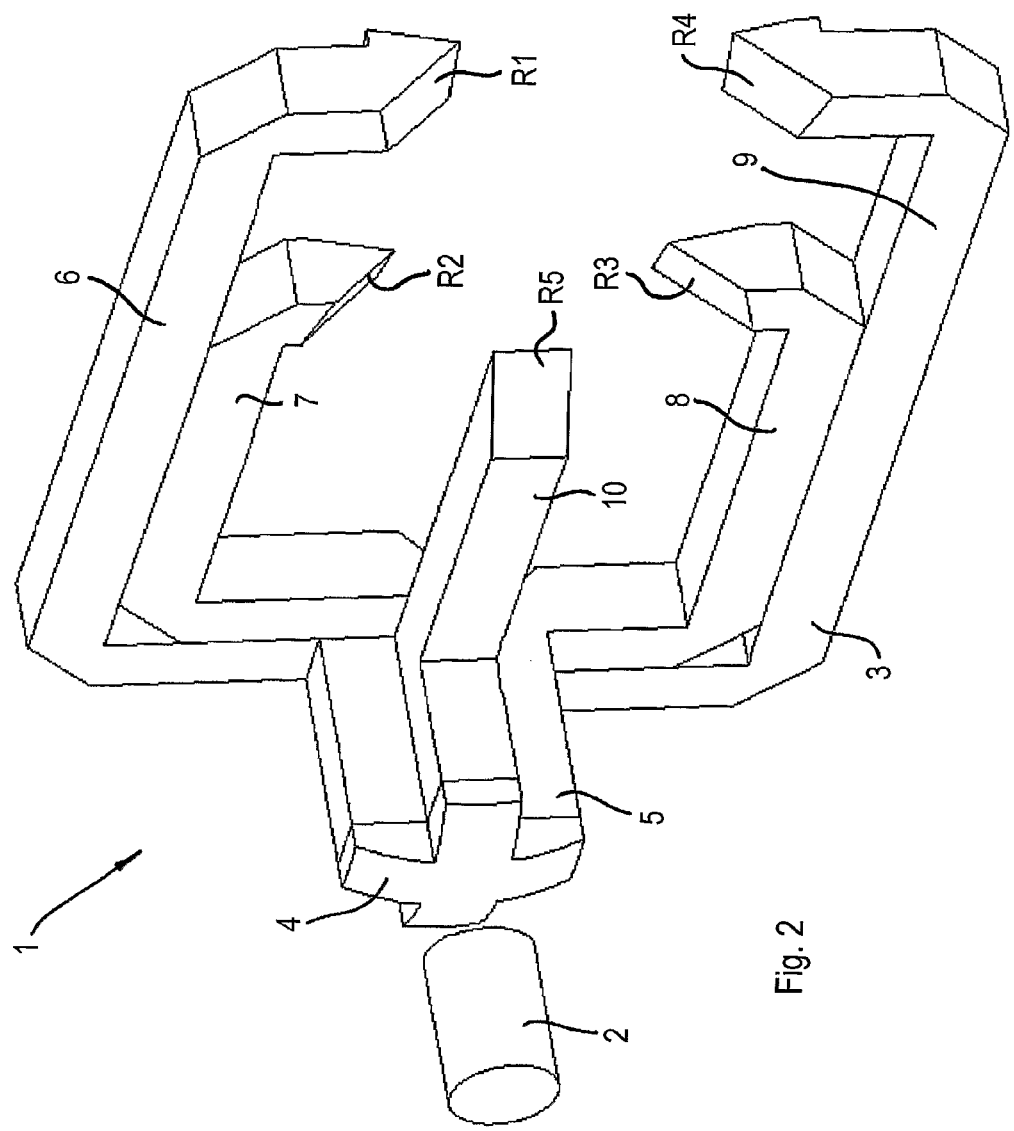
FIG. 2 is perspective rear view of the aiming device in FIG. 1.
Figure 3:
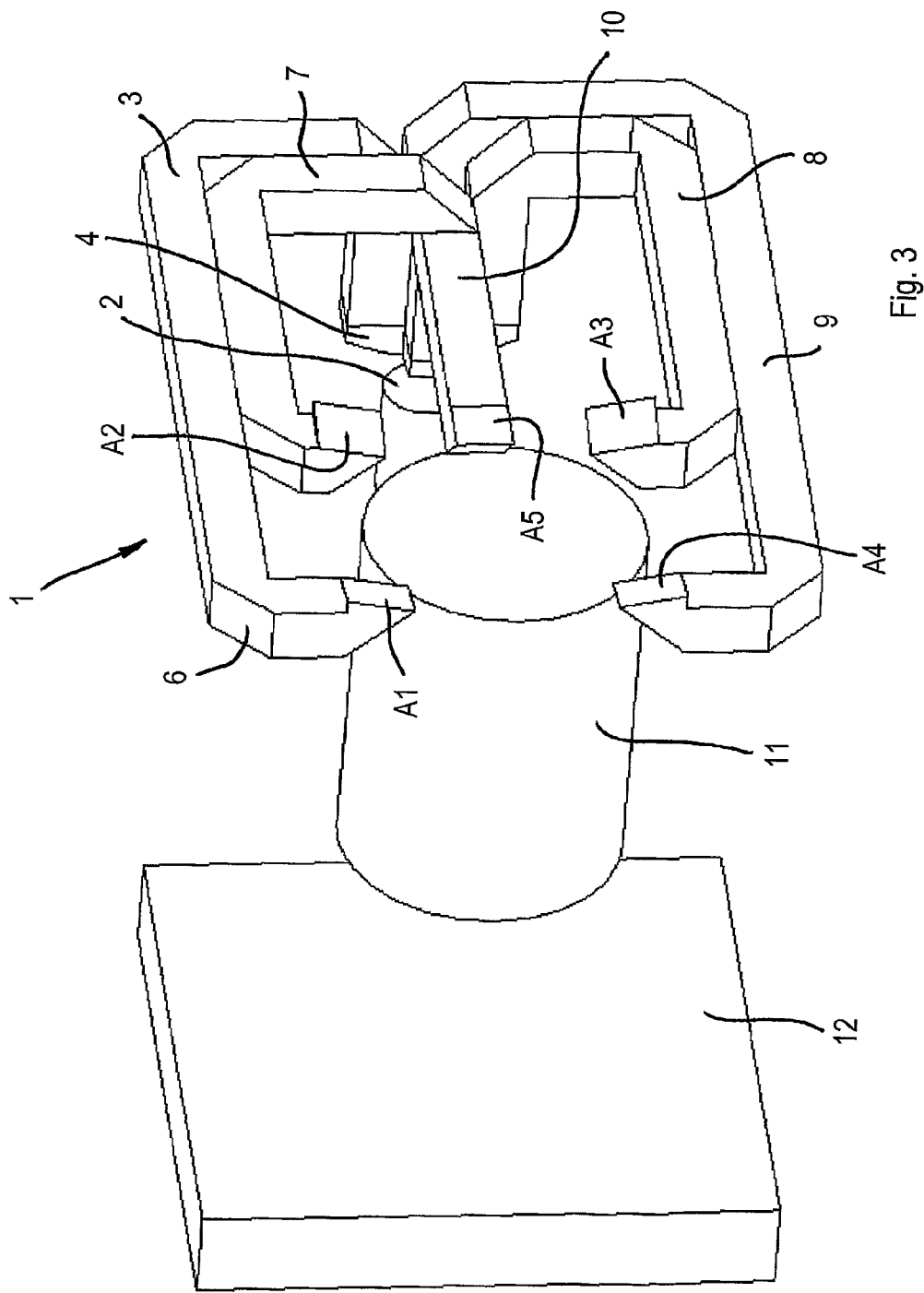
FIG. 3 is a perspective side view of the aiming device in FIG. 1 coupled to an objective-sensor assembly of an apparatus for reading optical information.

With reference to FIGS. 1 to 3, an aiming device 1 is shown which comprises a light source, for example a laser 2, coupled with a light guide 3.

Alternatively, the light source can comprise other lighting devices, such as a LED (Light Emitting Diode), or a lamp.

A lens 4 is interposed between the laser 2 and the light guide 3. The lens 4 collimates the laser beam at the entrance of the light guide 3, in such a way that rays entering the light guide 3 are parallel to one another. The lens 4 can be applied directly at an entrance end 5 of the light guide 3.

The light guide 3 comprises five branches, that is, a first branch 6, a second branch 7, a third branch 8, a fourth branch 9 and a fifth branch 10, each of which projects a reference image (in particular a substantially punctiform reference image, or spot) onto a defined aiming zone, for example, a reading plane 15 (FIG. 5) comprising an optical information to be acquired. As already stated, the optical information may comprise a linear or two-dimensional bar code, words, an image, or the like.

As shown in FIG. 3, the four branches projecting the peripheral spots onto the reading plane 15 (that is the first branch 6, the second branch 7, the third branch 8 and the fourth branch 9) terminate near a receiving objective 11 which focuses the framed code onto a sensor 12 with which an optical information reading device associated with the aiming device 1 is provided.

End portions of the first branch 6, the second branch 7, the third 8 and the fourth branch 9 are arranged in such a way that they partially surround the receiving objective 11. A1, A2, A3 e A4 respectively indicate exit surfaces of the first branch 6, the second branch 7, the third branch 8 and the fourth branch 9, that is to say, the peripheral branches of the light guide 3, while A5 indicates exit surface of the fifth branch 10, that is of central branch of light guide 3.

A masking element, not shown, is positioned around an active part of the lens 4 which collimates the laser beam, said masking element preventing all the rays emitted by the laser 2 that do not pass through the lens 4 from entering the light guide 3, thus blocking unwanted rays/reflections.

The laser beams that enter each branch of the light guide 3 undergo one or more internal reflections before leaving the light guide 3.

A suitably shaped diaphragm can further be provided, interposed between the laser 2 (or other light source) and an entrance of each branch of the light guide 3 in order to give a desired shape to each portion of collimated beam, thus generating a desired pattern as reference spot (e.g. triangle, circle, other geometrical form). The diaphragm can be interposed between the collimation lens 4 and the entrance of each branch, or it can be interposed between the source 2 and the collimation lens 4. In particular, the diaphragm can be directly made on the collimation lens 4, thus shading the zones involved so as to make said zones optically inactive.

In this ways, the light guide 3 can be customised, so as to obtain desired aiming patterns, without changing a mould with which the light guide 3 is produced (that is, without having to provide for each light guide 3 a section corresponding to the shape of the spot to be generated).

Figure 4:
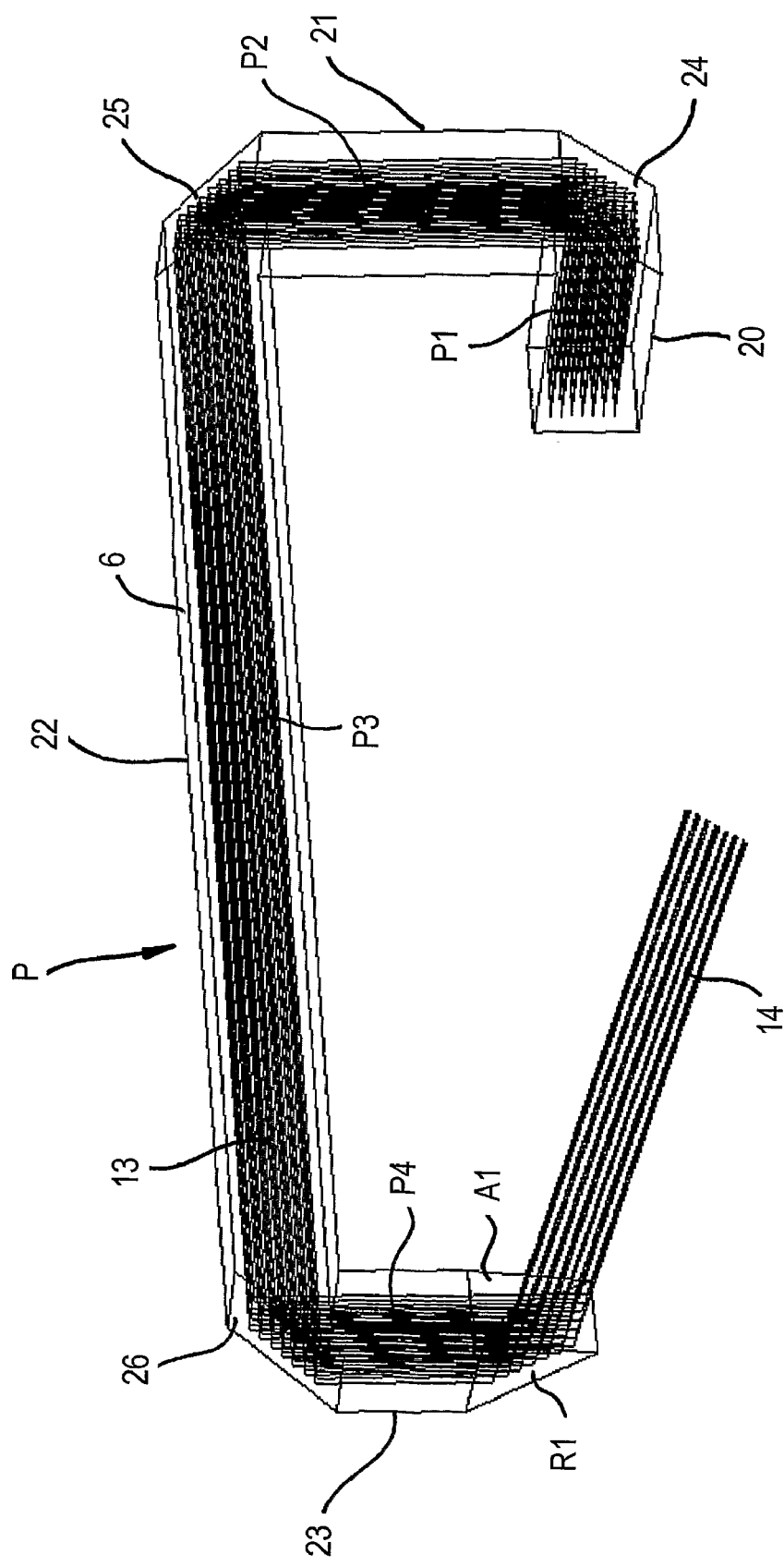
FIG. 4 is a perspective side view of a branch of a light guide of the aiming device in FIG. 1, showing an optical path of a luminous beam crossing said branch.

With reference to FIG. 4, a first laser beam 13 is shown entering the first branch 6.

The first branch 6 comprises a first portion 20, a second portion 21, a third portion 22 and a fourth portion 23 arranged in succession proceeding from the entrance end 5 towards the exit surface A1.

The first portion 20, the second portion 21, the third portion 22 and the fourth portion 23 define preferential directions for passage of the first laser beam 13, each portion being inclined in relation to an adjacent portion. Embodiments not shown of light guide can comprise branches provided with fewer or more than four portions.

Between each pair of adjacent portions a reflection surface is provided which directs the laser beam 13 coming from a more distant portion from the exit surface A1 towards a portion which is nearer to the exit surface A1, that is, proceeding along the path defined by the first laser beam 13, from a portion situated further upstream to a portion further downstream.

In particular, between the first portion 20 and the second portion 21 a first reflection surface 24 is interposed, between the second portion 21 and the third portion 22 a second reflection surface 25 is interposed and between the third portion 22 and the fourth portion 23 a third reflection surface 26 is interposed.

Each reflection surface 24-26, which also acts as a connecting surface between consecutive portions of the guide, is oriented at an angle of 45° with respect to longitudinal axes of two adjacent portions of the same branch. This angle has been chosen for two reasons.

Firstly, said angle is greater than the critical angle at which total internal reflection begins (this minimum angle depends on the material; said minimum angle for polycarbonate—of which the guide is made in the preferred embodiment—is approximately 39°. With an angle lower to this minimum angle, the collimated beam would have been transmitted in part through the connecting surfaces and thus out of the guide, therefore making the aiming device inefficient and even creating disturbance. It is therefore opportune for a guide made of optically transparent material that internal propagation of the beam is performed by total internal refection.

Secondly, if the reflection surfaces 24-26 are inclined by 45°, the consecutive portions of each branch are at right angles to each other. Otherwise, in order to ensure that the beam proceeded parallel to the longitudinal axis of each portion, it would have been necessary to calculate the inclination of each portion with respect to the preceding portion evaluating the incidence and reflection angles on each connecting surface, that is, on each reflection surface 24-26. Inclining at 45° the reflection surfaces 24-26 therefore simplifies calculation of paths followed by the rays.

Inside the first branch 6, the first laser beam 13 follows a preset path P in such a way that when the laser beam 13 comes out of the light guide 3, it defines a spot having a desired position in a very clear and accurate way—with modalities that will be described below.

In particular, since the first laser beam 13 has been collimated by the lens 4, the first laser beam 13 traverses each branch of light guide 3, remaining substantially parallel to a longitudinal axis of the branch.

As a result, the preset path P is defined by a plurality of portions of path (a first portion of path P1 associated with the first branch 20, a second portion of path P2 associated with the second branch 21, a third portion of path P3 associated with the third branch 22 and a fourth portion of path P4 associated with the fourth branch 23) each of which is substantially linear.

Apart from absolutely irrelevant losses, due for example to border effects on surfaces delimiting each of the five branches 6-10 of the guide and in the contact/separation zone between adjacent branches of the guide, all the luminous radiation which defines the first laser beam 13 contributes to form said spot. In other words, no portions of the luminous radiation defining the first laser beam 13 leave the first branch 6 through any surface except the exit surface A1, and therefore no indefinite image or disturbance is generated on the reading plane 15 that would make it difficult, or even impossible, to identify univocally an aiming area 16 (FIG. 5) identified by the aiming device 1. The first branch 6 is provided—downstream of the fourth portion of path P4—with a reflection surface R1 which further reflects the laser beam 13 before the latter leaves the first branch 6 through the exit surface A1.

The reflection surface R1 is the last reflection surface of the first branch 6 in which there is an internal reflection. The reflection surface R1 is suitably inclined so that a portion of beam 14 of the first laser beam 13 leaving the light guide 3 through the exit surface A1 has a desired direction.

Furthermore, the exit surface A1 is perpendicular to the portion of beam 14 leaving the first branch 6. In this way, the direction of the portion of beam 14 leaving the first branch 6 is independent of the refractive index of the material of which the light guide 3 is made. In other words, once a spatial orientation of the reflection surface R1 and that of the reflection surface A1 (perpendicular to the exiting beam) have been defined, it is always possible to change the type of material of the light guide 3 (polycarbonate, acrylic, etc.) without changing the direction of the portion of beam 14 leaving the first branch 6.

The above considerations apply to the other four branches 7-10 of the light guide 3, that is to the branches provided with the exit surfaces indicated by reference A2-A5.

These branches too are provided with reflection surfaces, indicated with R2-R5 in FIG. 2—cooperating with the corresponding exit surfaces A2-A5.

Each branch of the light guide 3 projects a luminous spot onto the plane of code. In this way, having suitably defined for each branch the spatial orientation of the last reflection surface (indicated by R1 in the case of first branch 6) and of the exit surface (indicated by A1 in the case of first branch 6), a pattern formed by five spots is obtained, four peripheral spots (forming a quadrilateral) and a central spot. The shape and dimension of each of these spots substantially correspond to the shape and dimension of the corresponding exit surface of the respective branch, or to the shape and dimension of the aperture of the diaphragm associated with said branch.

By orienting in a suitable way the reflection surfaces and the exit surfaces of the first branch 6, the second branch 7, the third branch 8 and the fourth branch 9, a peripheral projection pattern is defined on the plane of code.

Alternatively, instead of a light guide 3 made of transparent material, a hollow light guide 3 made of a non-transparent material can be used, while all the internal reflection surfaces (24-26 for branch 6) and all the last reflection surfaces (R1 for the branch 6 and R2-R5 for the branches 7-10) are coated with, or made of, a reflecting material (e.g. a mirror). In this variant it is not necessary to provide the exit surfaces A1-A5.

Embodiments of the light guide, not illustrated, can comprise more or fewer than five branches.

In an embodiment, four branches can be provided which generate four spots arranged such as to identify vertices of a quadrilateral. This embodiment is similar to the previously described embodiment, but lacks the central branch, i.e. the fifth branch 10.

A further embodiment can comprise three branches that generate three spots, two of which are arranged such as to identify opposite vertices of a quadrilateral and a third of which is arranged such as to identify a central area of the quadrilateral. In a further embodiment, the three branches can be arranged such as to identify the three vertices of a triangle.

A still further embodiment can comprise two branches that generate two spots arranged such as to identify opposite vertices of a quadrilateral.

The above-described embodiments are particularly advantageous when two-dimensional optical information is to be acquired.

A still further embodiment can comprise two branches that generate two substantially aligned spots.

This embodiment is particularly advantageous when linear optical information is to be acquired.

Three configurations of the light guide 3 are described herein below, which put in relation the aiming area 16 with an area 17 which is framed by the matrix sensor 12, which framed area 17 is detected by the receiving objective 11 according to a distance between code to be read and reader.

The orientation of the reflection surface R5 and of the exit surface A5 of the fifth branch 10 remains unchanged in all the above-described configurations.

Figure 5:
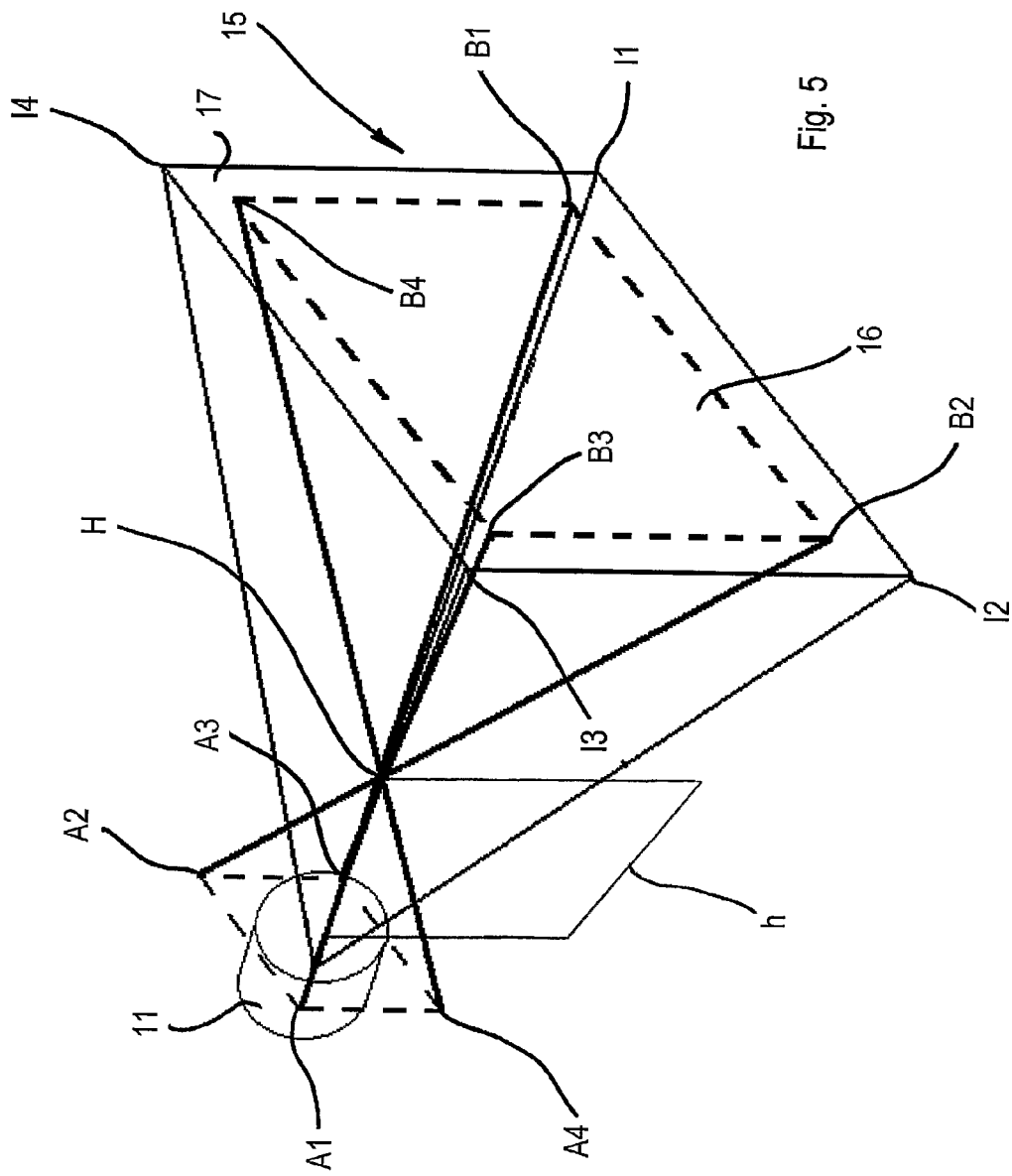
FIG. 5 is a schematic perspective view of an aiming area identified by four luminous beams emitted by a first embodiment of the aiming device.

As shown in FIG. 5, in the first configuration the exit surfaces A1-A4 are so oriented that the pattern projected by the four peripheral branches of the light guide 3 delimits, on the reading plane 15, a rectangular surface having vertices B1-B4, which identifies the aiming area 16.

The four laser beams coming out of the peripheral branches of the light guide 3 intersect each other at a point H, situated on the optical axis of the receiving objective 11 at a distance h from the receiving objective 11. In this way it is evident that for code-objective distances greater than h the aiming area B1-B4 is always contained within the reader field of view of the reader (identified in FIG. 5 by a further rectangular surface having the vertices 11-14). In particular, if the point H is between the receiving objective and the exit glass of the reader, the framed area 17 always contains the aiming area 16 for every code/reader distance.

Actually, a point exists along the optical axis, at a preset distance from receiving objective 11, at which the framed area 17 and the aiming area 16 substantially coincide. For code/reader distances greater than this preset distance, the relation between the aiming area 16 and the framed area 17 is inverted, with the former containing the latter. These distances, typically very long, are not however considered operational distances, so it is reasonable to assert that for each operational code-reader distance the aiming area 16 is always contained within the framed area 17.

Figure 6:
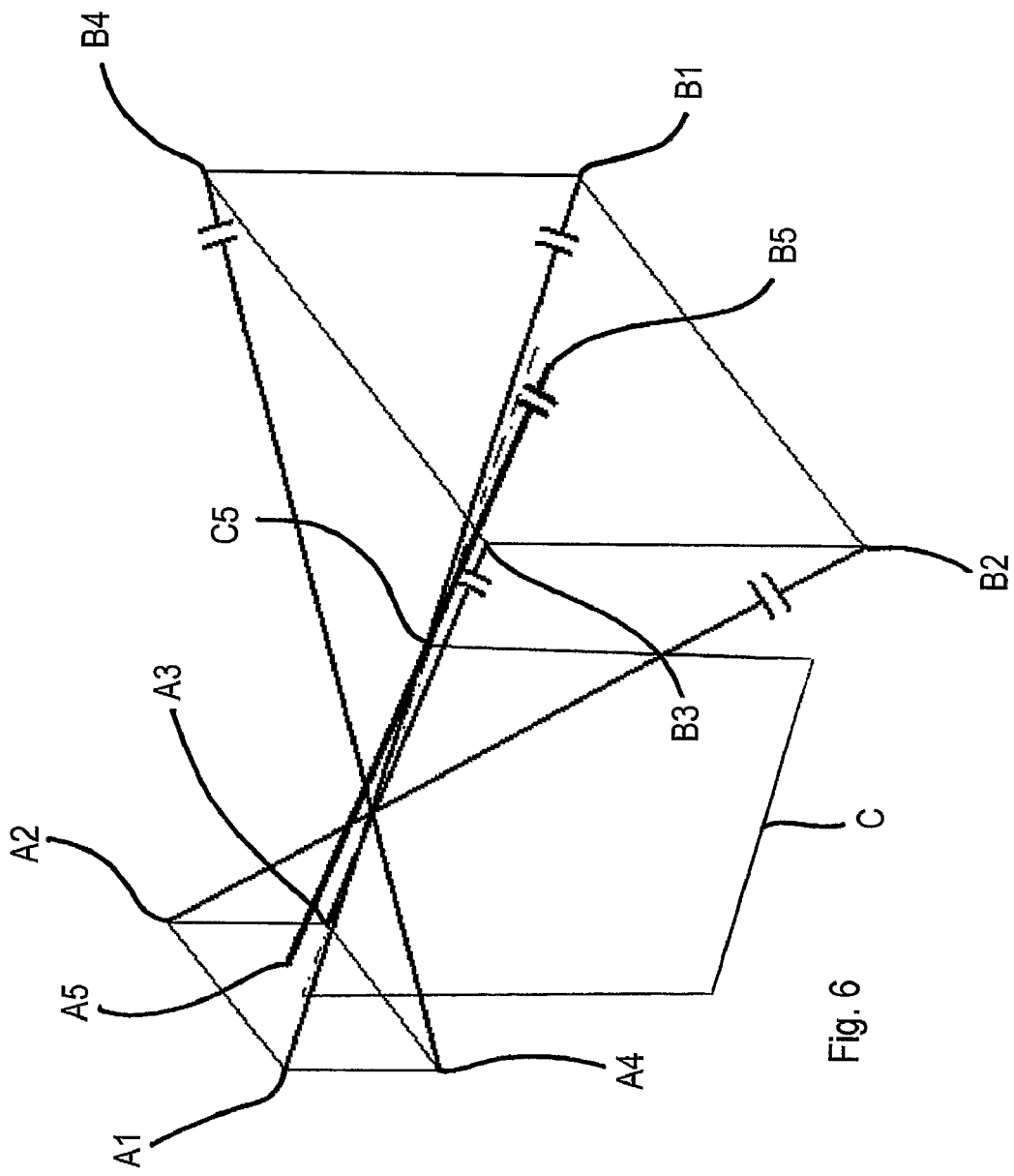
FIG. 6 is the view of FIG. 5 showing an aiming area identified by five luminous beams.

To clarify better, in FIG. 5 the spot generated by the fifth branch 10 (that is by the central branch of the light guide 3 which comprises the exit surface A5) has not been shown on the reading plane 15. The fifth branch 10 generates a spot that is situated in proximity of the centre of the aiming area 15. In particular, as shown in FIG. 6, the spatial orientation of the last reflection surface R5 of fifth branch 10 and that of exit surface A5 are such that a fifth laser beam, coming out of fifth branch 10, intercepts the optical axis of the receiving objective 11 at only one point—indicated by C5 in FIG. 613 at a distance c from the receiving objective. Thus the fifth beam is misaligned with respect to optical axis of receiving objective 11 and generates the spot B5 on the reading plane 15.

Figure 7:
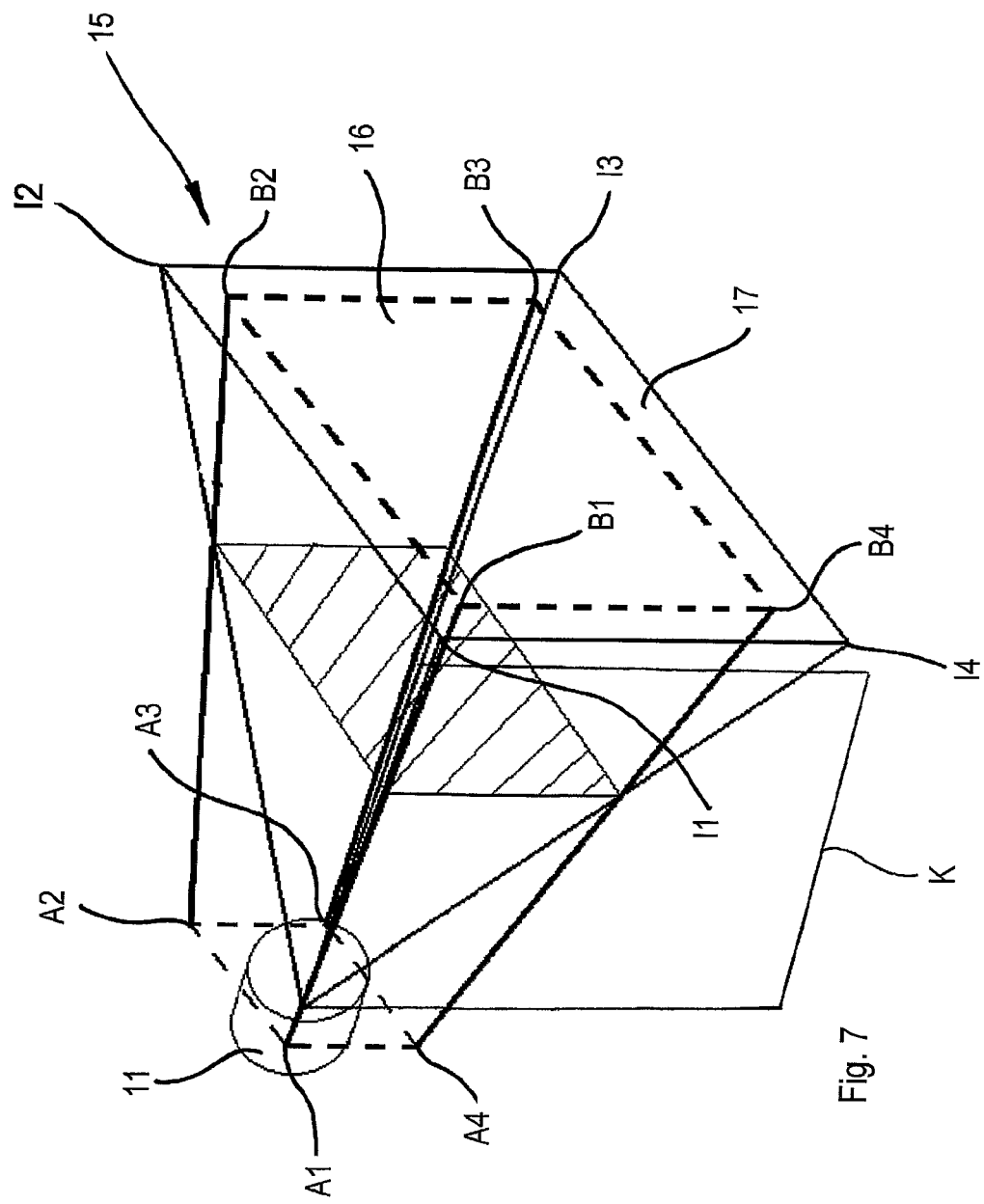
FIG. 7 is the view of FIG. 5, showing an aiming area identified by four luminous beams emitted by a second embodiment of the aiming device.

As shown in FIG. 7, in the second configuration the exit surfaces A1-A4 are oriented in such a way that the pattern projected by the four peripheral branches of the light guide 3 delimits, on the reading plane 15, a rectangular surface having vertices B1-B4 which identify the aiming area 16.

The four laser beams coming out of the peripheral branches have no point of intersection. In particular, in this configuration the aiming area 16 and the framed area 17 substantially coincide at a distance k from receiving objective 11. For code-reader distances smaller than distance k, the aiming area 16 always contains the framed area 17 while, for code-reader distances greater than distance k, the aiming area 16 is always contained within the framed area 17.

To clarify better, FIG. 7 does not show the spot generated on the reading plane 15 by the central branch of the guide, the position of which remains unchanged with respect to the first configuration previously described.

With this configuration, the operator using the reading device at code-reader distances smaller than k cannot be certain that a code belonging to aiming area 16 is really framed and therefore acquired by the reader sensor and then decoded. In fact, a code near an edge of the aiming area 16 could be left out (also only partially) of the framed area 17. However, in reading applications at short distances the codes to be read have generally small dimensions and the indication given by the spot generated by the central branch of the guide constitutes a sufficient reference for the operator.

Figure 8:
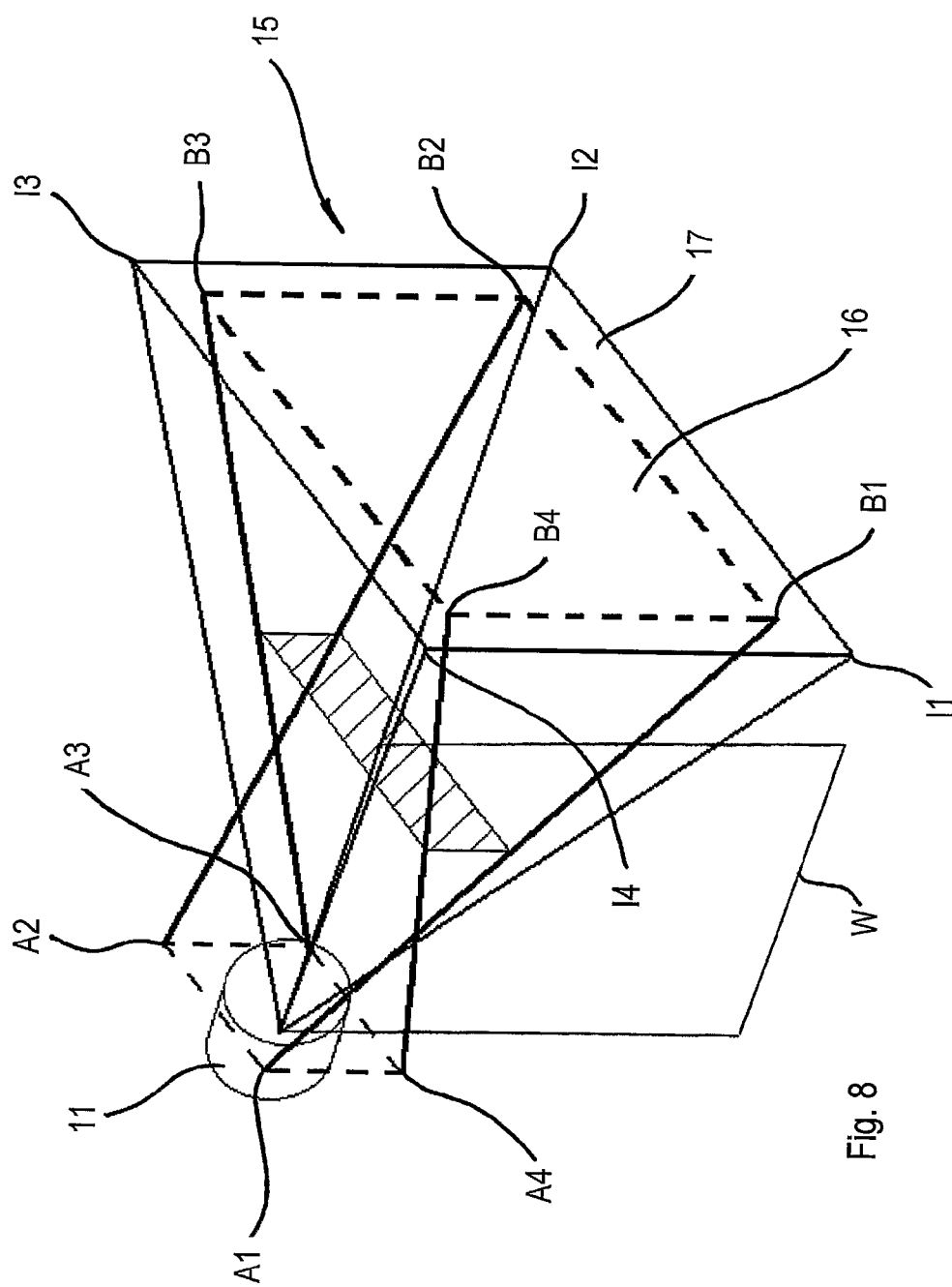
FIG. 8 is the view of FIG. 5, showing an aiming area identified by four luminous beams emitted by a third embodiment of the aiming device.

As shown in FIG. 8, in the third configuration the exit surfaces A1-A4 are so oriented that the pattern projected by the four peripheral branches of the light guide 3 delimits, on the reading plane 15, a rectangular surface having vertices B1-B4 which identify the aiming area 16.

The four laser beams coming out of the peripheral branches intersect each other in pairs, or two by two. In particular, in the third configuration, starting from a distance w from the receiving objective 11 the aiming area is contained within the framed area 17. With distances of the receiving objective 11 from the code that are greater than distance w, the framed area 17 always contains the aiming area 16, while with distances of the receiving objective 11 from the code which are smaller than distance w it is not possible to be certain whether the framed area 17 contains, or is contained in, the aiming area 16.

To clarify better, FIG. 8 does not show the spot generated on the reading plane 15 by the central branch of the guide, the position of which remains unvaried with respect to the above described first and the second configurations.

Various embodiments of the light guide 3 are possible.

Figure 11:
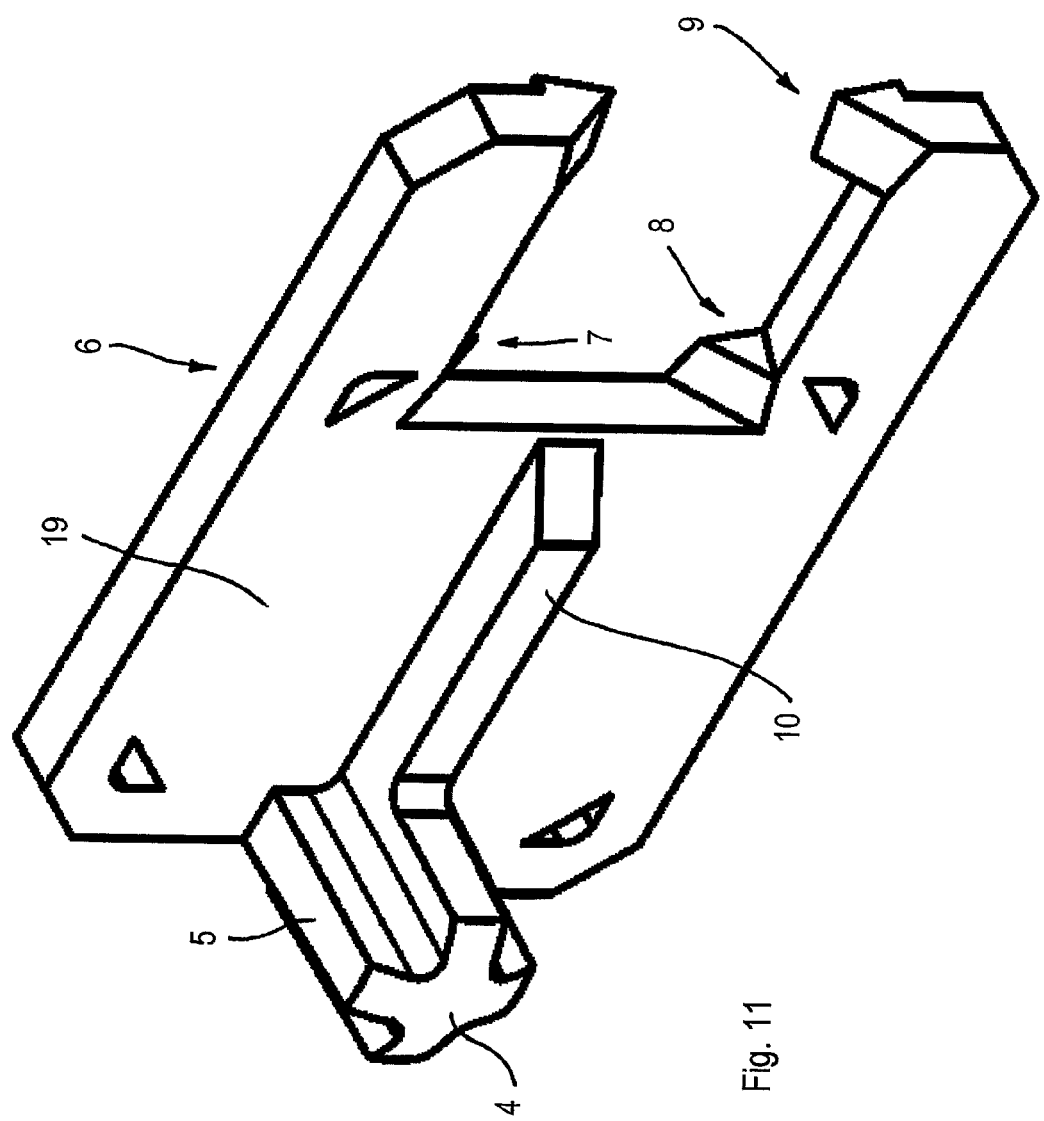
FIG. 11 is the view of FIG. 9 showing a light guide comprising optically inactive filling elements.

In one embodiment, shown in FIG. 11, fillings 19 can be inserted within the light guide 3, said fillings being optically inactive portions arranged for increasing the mechanical resistance of the light guide 3, leaving unaltered the optically active surfaces.

Figure 10:
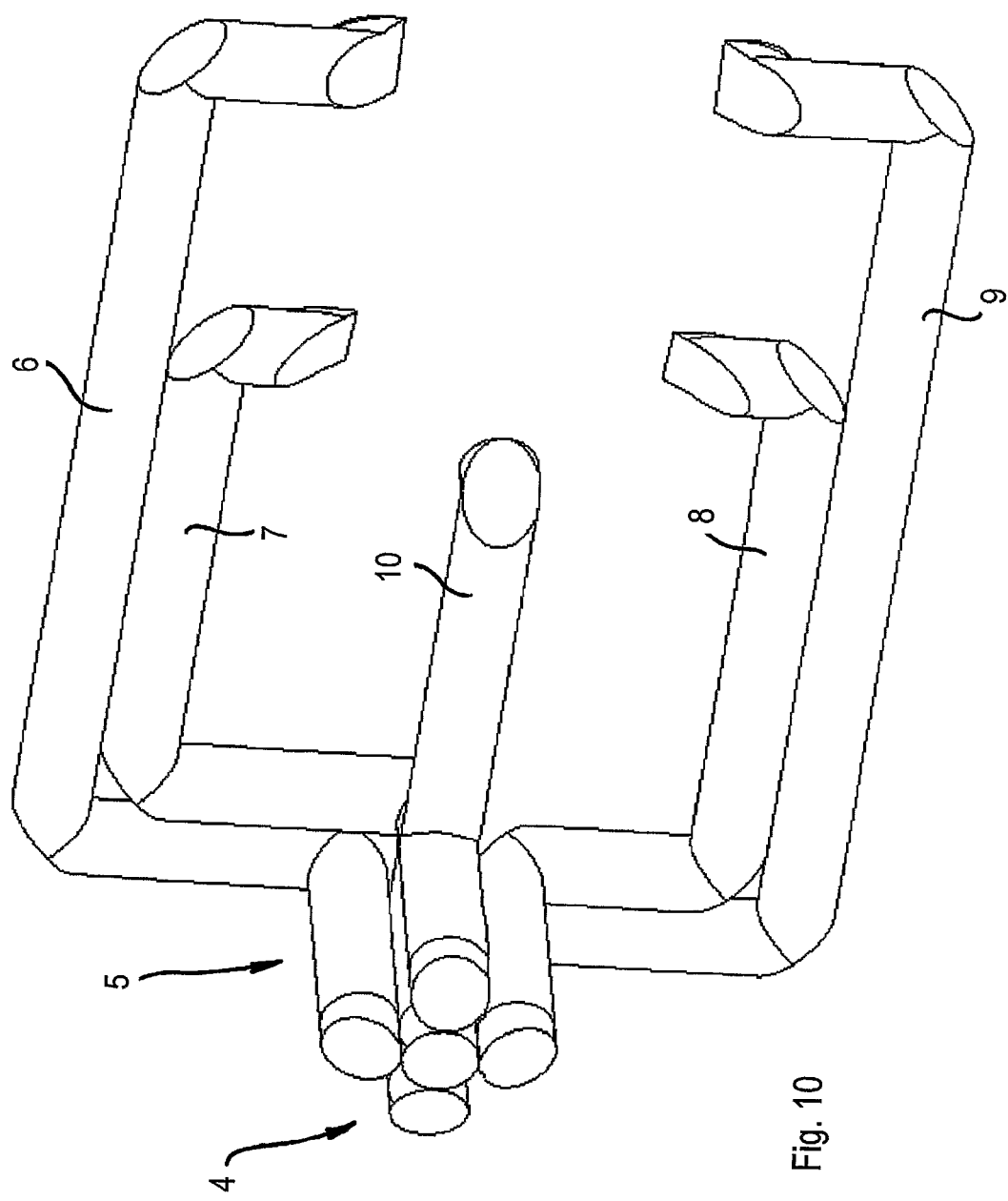
FIG. 10 is the view of FIG. 9 showing a light guide having a circular section.

In a further embodiment, shown in FIG. 10, the light guide 3 can comprise portions of guide having a circular section.

Figure 9:
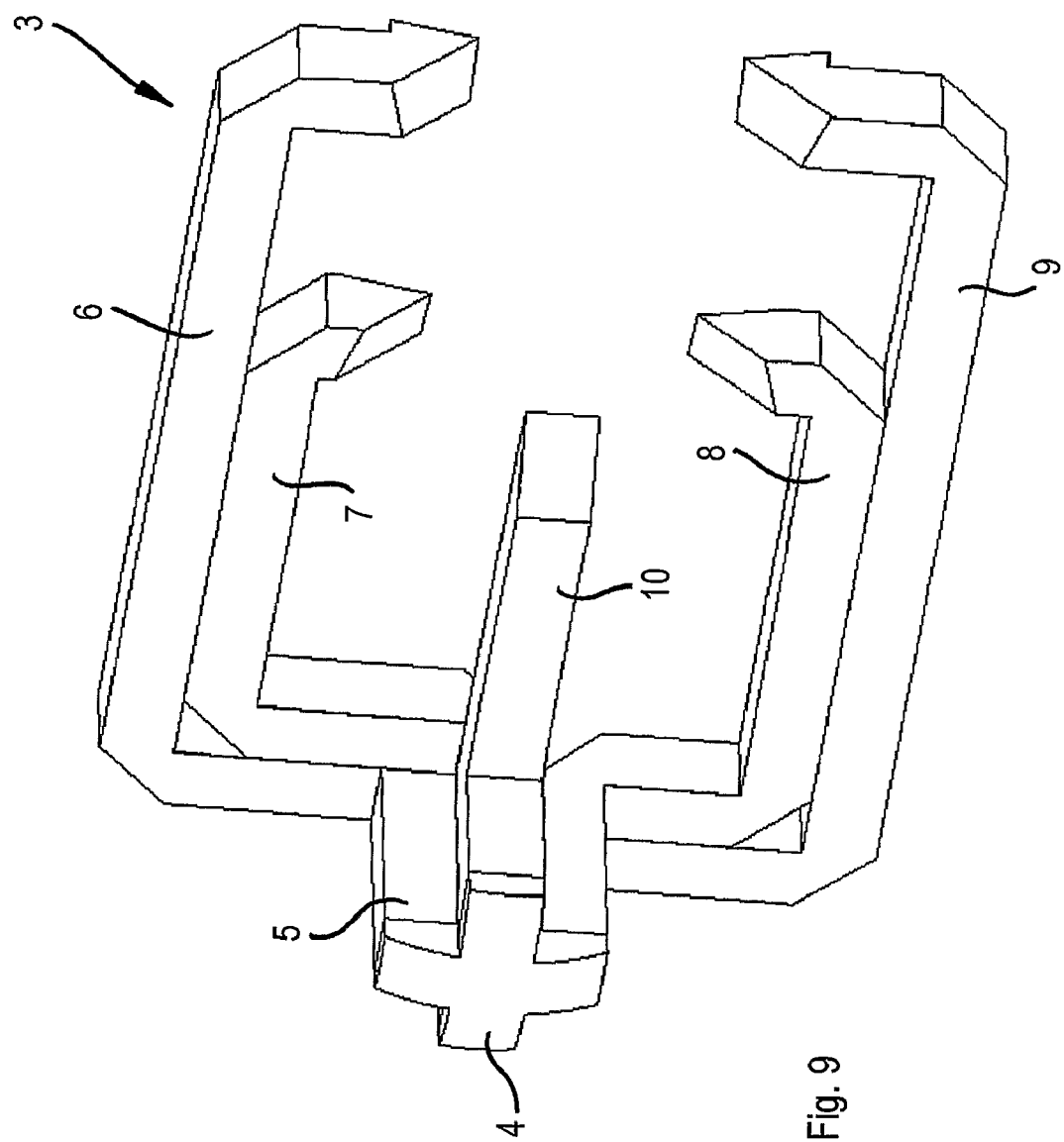
FIG. 9 is a perspective rear view of a light guide having a square section.

In a further embodiment, shown in FIG. 9 and in FIGS. 1 to 3, the light guide 3 can comprise portions of guide having a square or rectangular cross-section.

Figure 12:
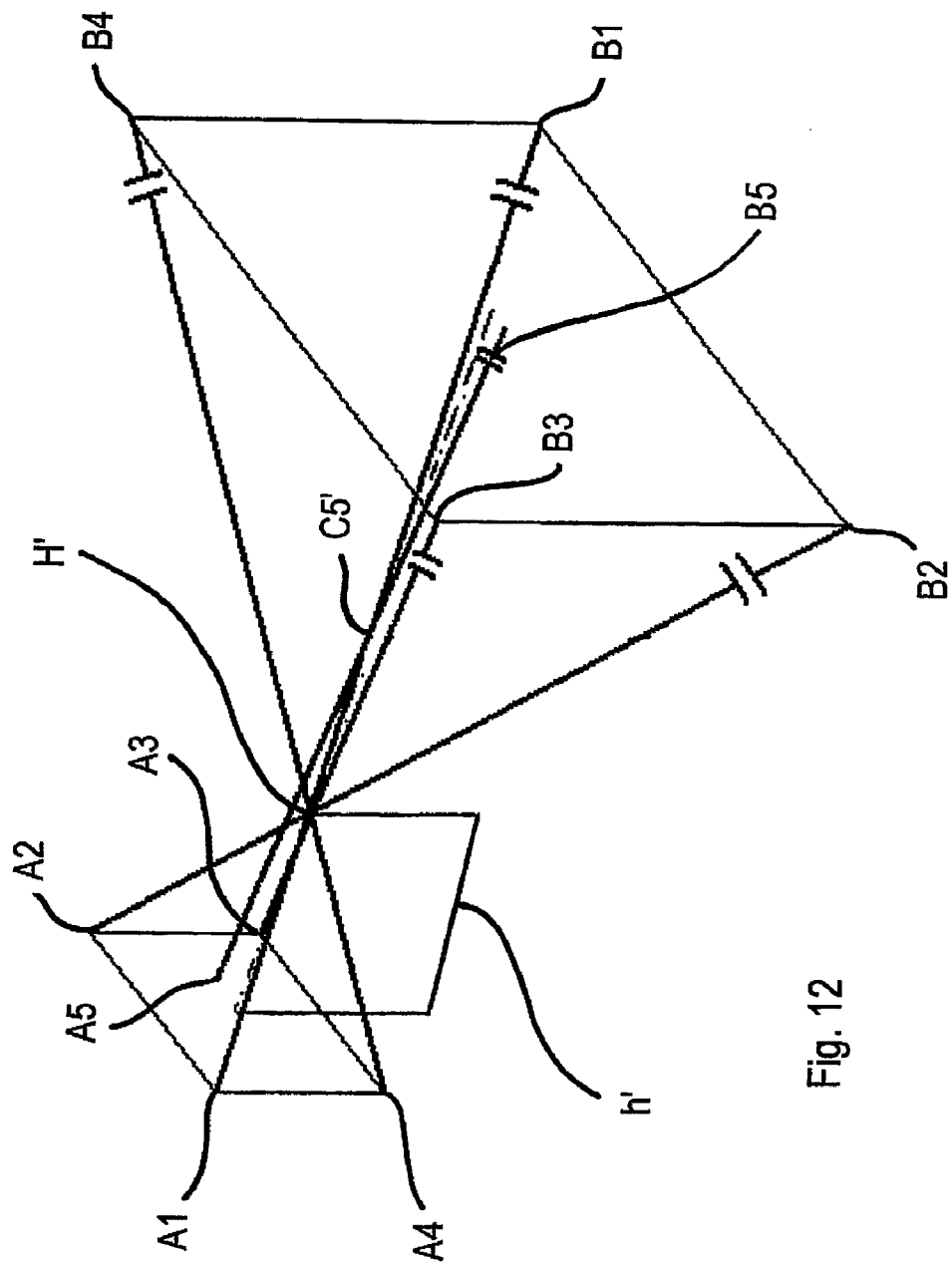
FIG. 12 is the view of FIG. 6 showing a particular structural solution for the light guide.
Figure 13:
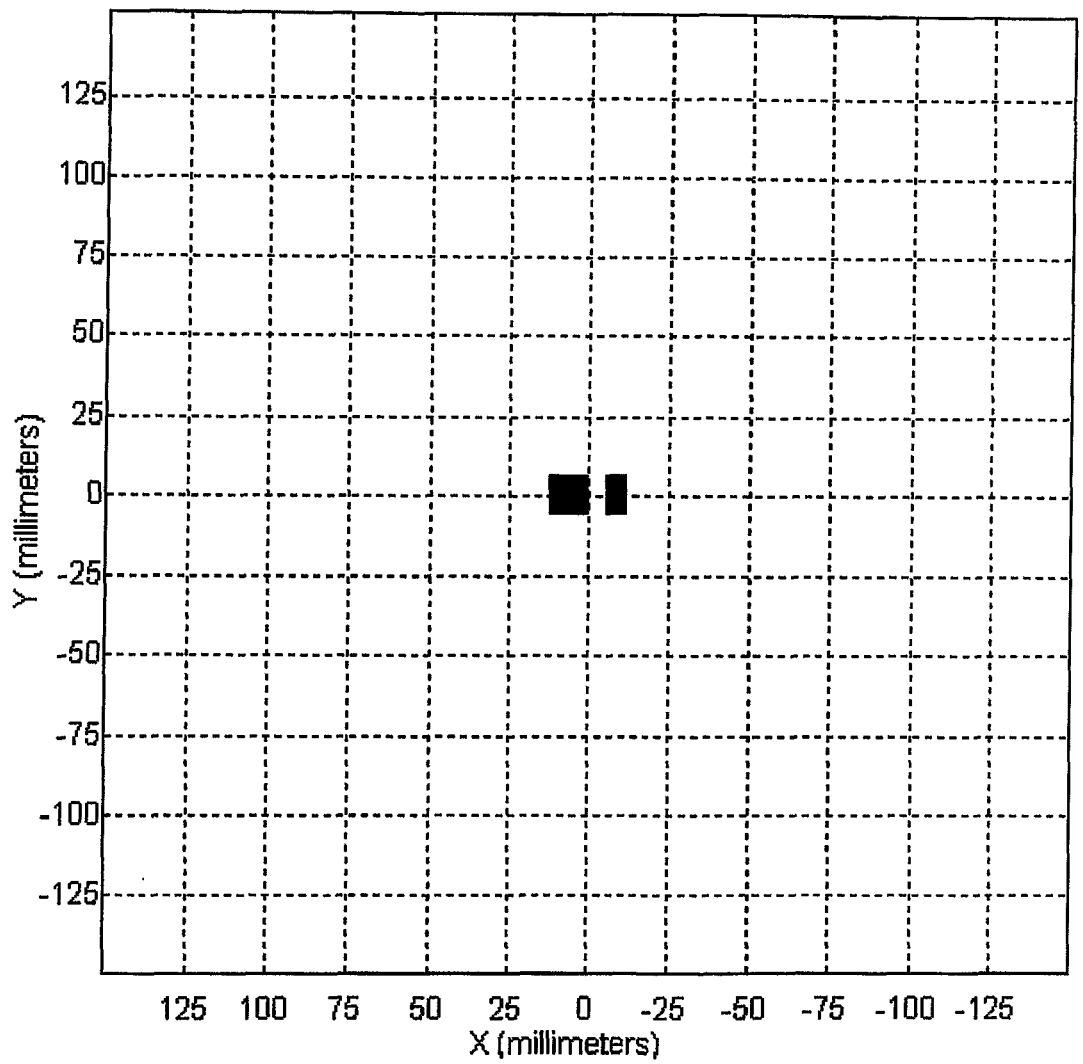
FIG. 13 is an irradiance map of the aiming device at a distance of 50 mm from an objective of an apparatus for reading optical information.
Figure 14:
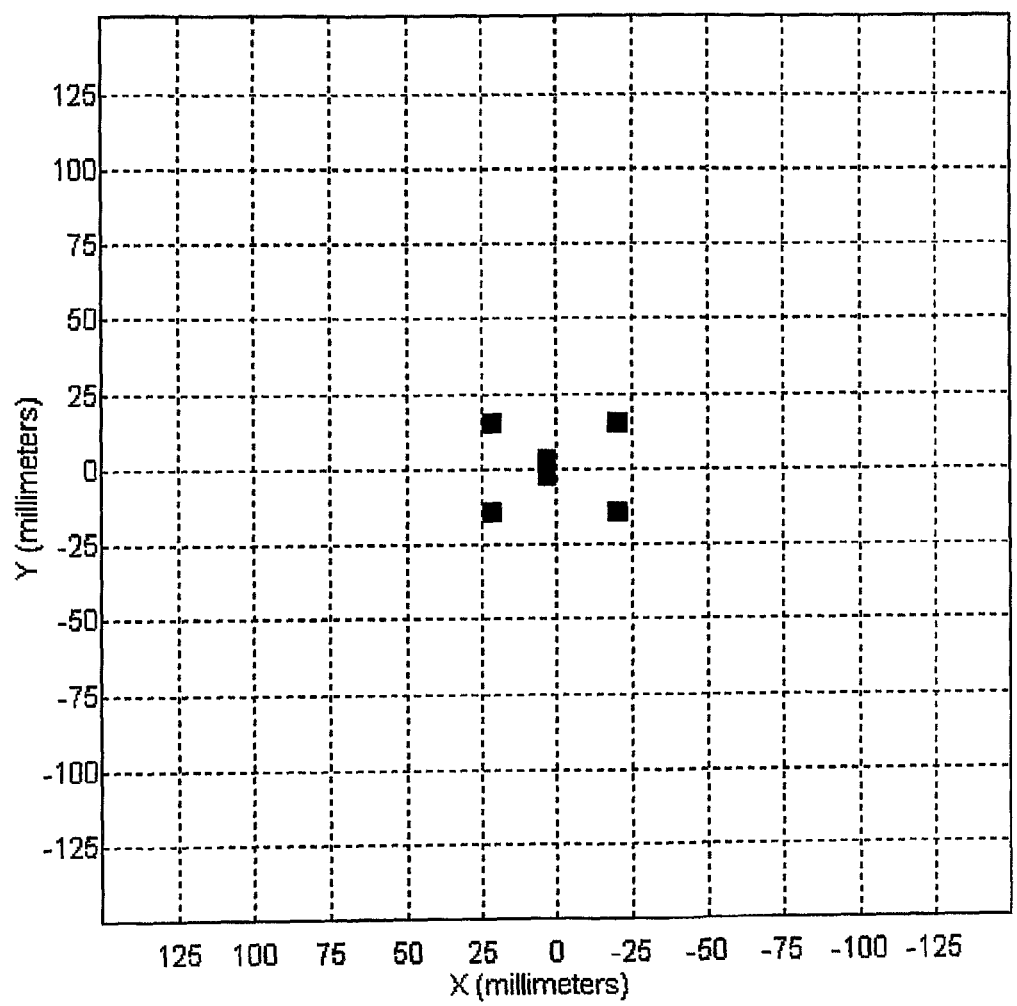
FIG. 14 is an irradiance map of the device in FIG. 13 at a distance of 100 mm from the objective of the apparatus for reading optical information.
Figure 15:
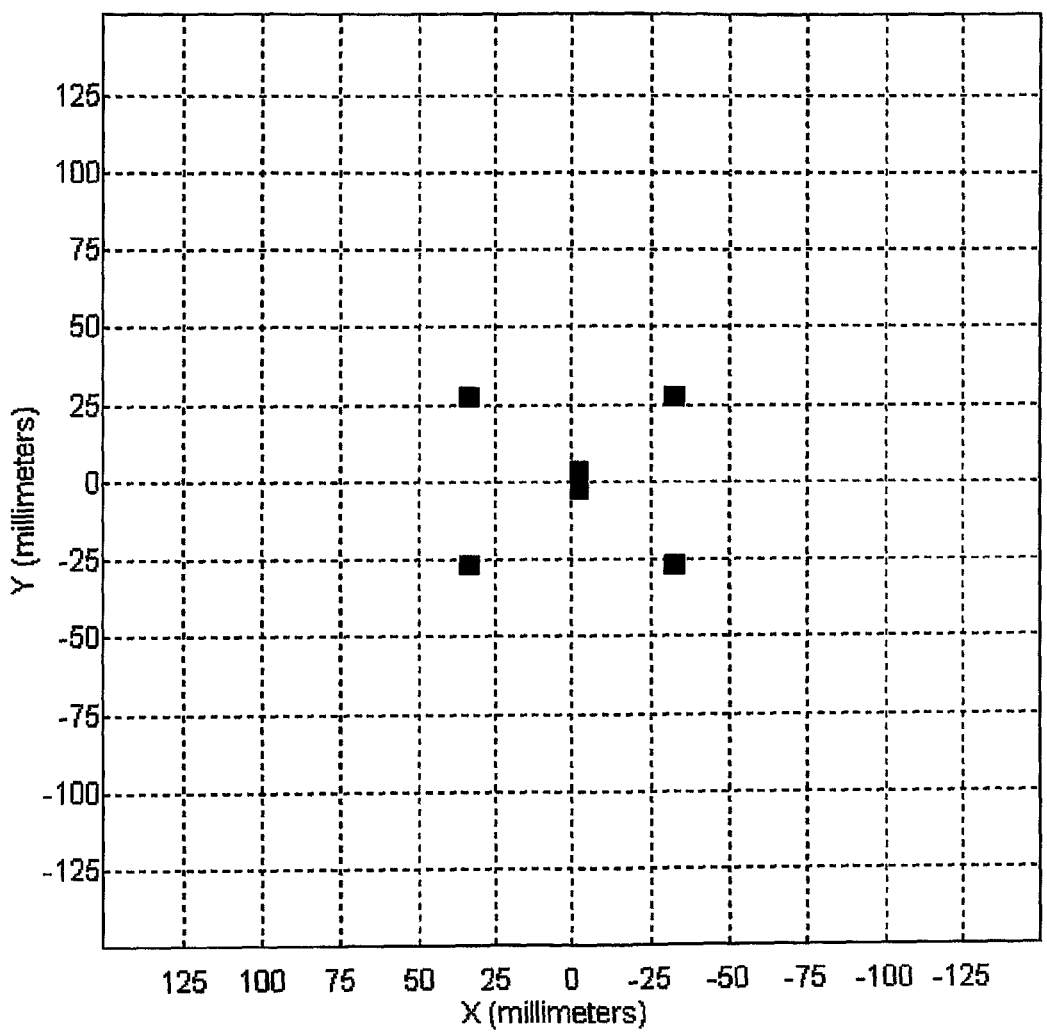
FIG. 15 is an irradiance map of the device in FIG. 13 at a distance of 150 mm from the objective of the apparatus for reading optical information.
Figure 16:
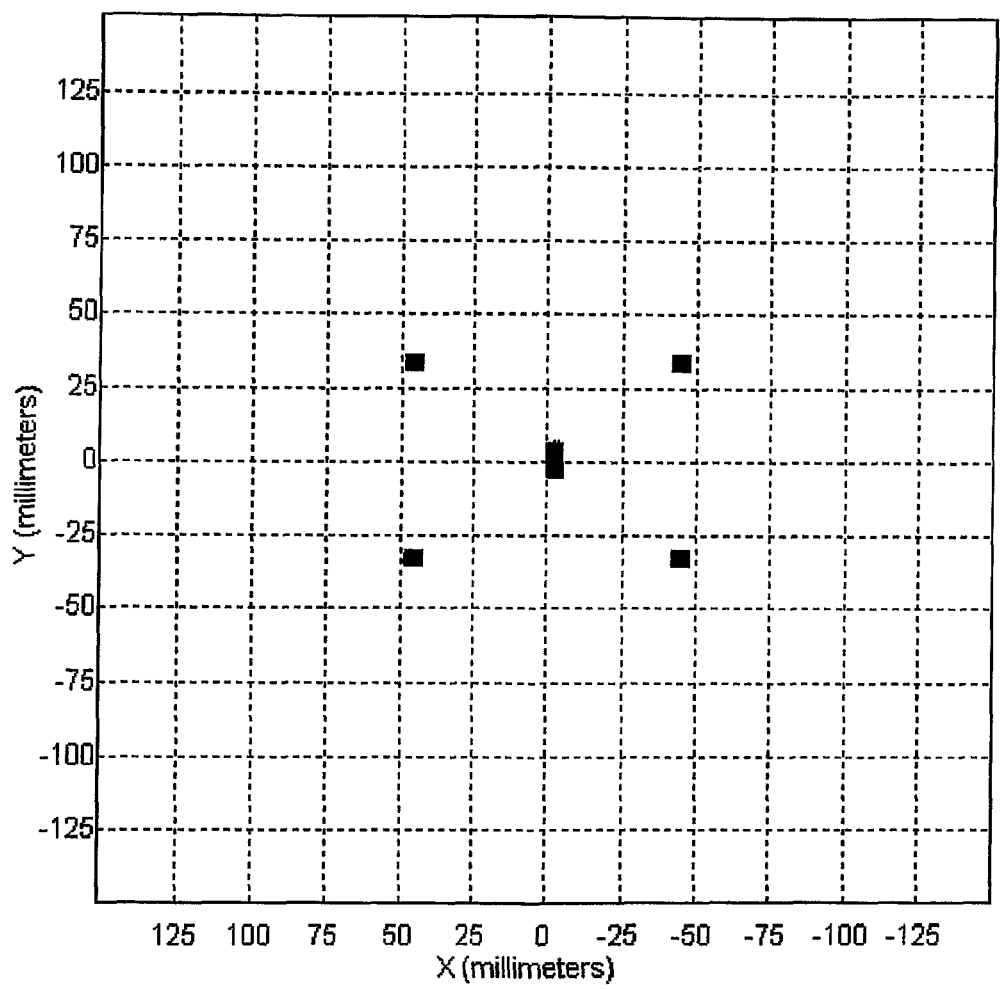
FIG. 16 is an irradiance map of the device in FIG. 13 at a distance of 200 mm from the objective of the apparatus for reading optical information.
Figure 17:
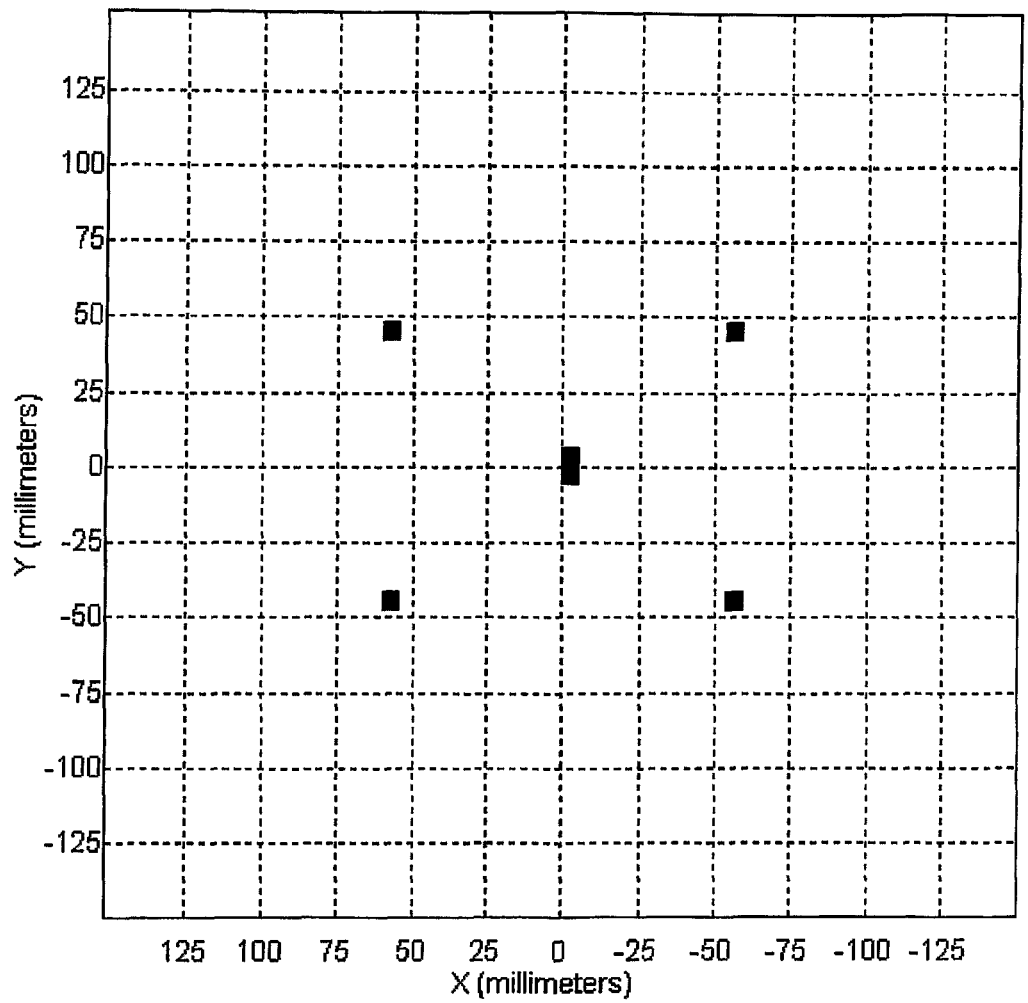
FIG. 17 is a map of irradiance of the device in FIG. 13 at a distance of 250 mm from the objective of the apparatus for reading optical information.
Figure 18:
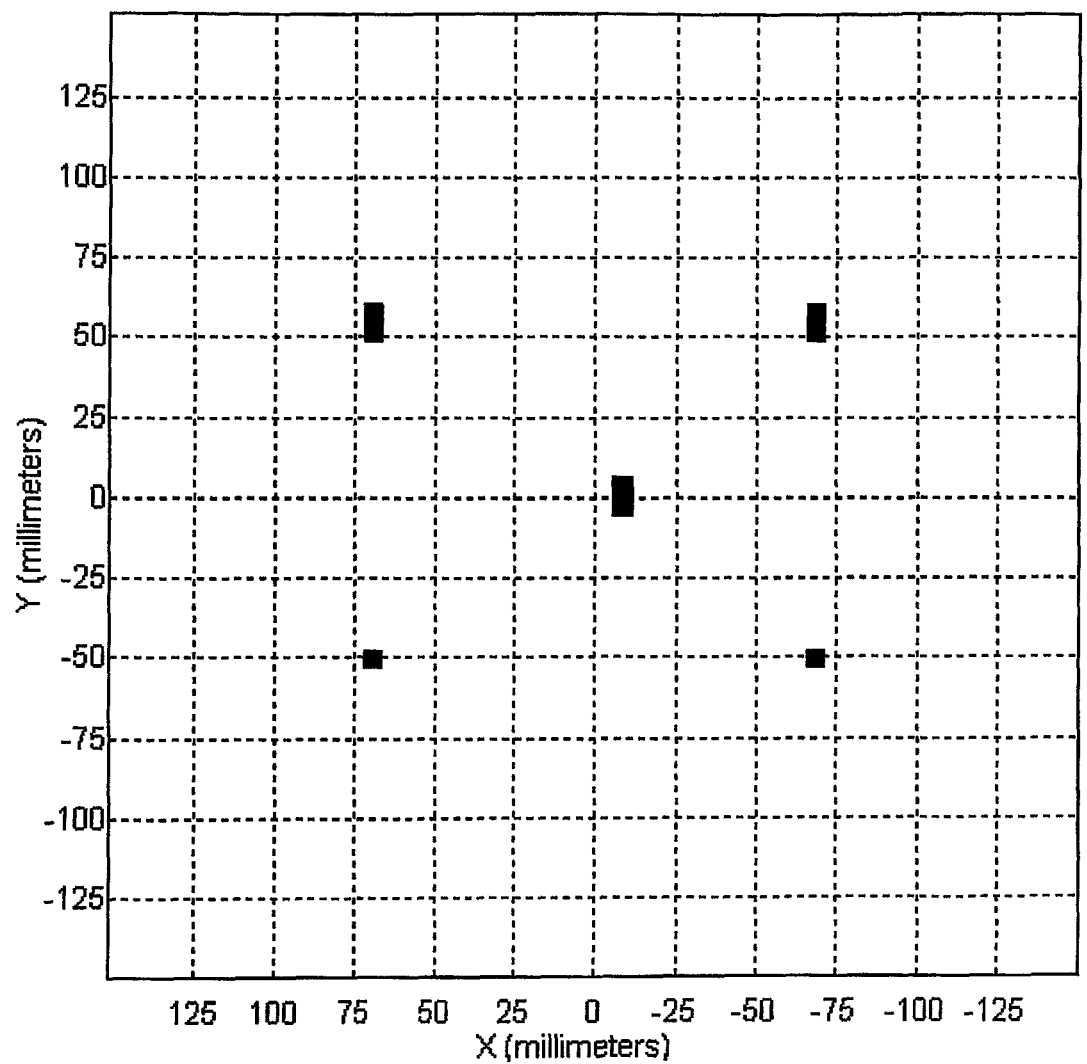
FIG. 18 is a map of irradiance of the device of FIG. 13 at the distance of 300 mm from the objective of the apparatus for reading-optical information.

In a preferred embodiment, schematically shown in FIG. 12, the light guide 3 comprises portions of guide having a square section of 1.4 mm×1.4 mm. The light guide 3, similarly to what is shown in FIG. 11, comprises optically inactive fillings to increase mechanical stability.

In this preferred embodiment, the exit surfaces A1-A4 of the four peripheral branches of light guide 3 are arranged according to the first configuration which has been described with reference to FIGS. 5 and 6. The laser beams coming out of the four peripheral branches of the light guide 3 intersect one another at the point H' of the optical axis which is less than 30 mm from the receiving objective 11. If the distance between receiving objective 11 and exit glass of the reader is greater than h', the above-mentioned laser beams are always contained within the framed area 17. The laser beam coming out of the central branch intersects the optical axis at the point C5' which is approximately 150 mm from the receiving objective 11.

Having defined all these parameters, the light guide of the preferred embodiment above described has been modelled using the TracePro® ray-tracing simulation program. The results obtained from the simulation program match those calculated during the design process very well. In the simulations it was established that a beam of parallel rays (those coming out of the collimating lens) strikes the five branches and an irradiance map on the plane of code was obtained in, relation to the distance from the objective. The results are illustrated in FIGS. 13 to 18.

A comparison between values of x, y coordinates (in mm) of the points B1-B4 (FIG. 12) on the plane of code calculated during design of the light guide, at a distance of 300 mm from the receiving objective 11, compared with values B1S-B5S (FIG. 18) obtained from simulations, gives an extremely good match:

B1=(−64.8, −53.5) ⇒B1S=(−68.2, −53.3)
B2=(68.4, −53.5) ⇒B2S=(68.2, −53.3)
B3=(68.4, 53.5) ⇒B3S=(68.3, 53.6)
B4=(−64.8, 53.5) ⇒B4S=(−68.2, 53.6)

Similarly, comparing, at a distance of 150 mm from the receiving objective 11, the x, y coordinates of the point B5 as per design (FIG. 12) with the simulated coordinates B5S (FIG. 15), a very good correspondence is obtained:

B5=(0, 0) ⇒B5S=(−0.6, 0)

Figure 19:
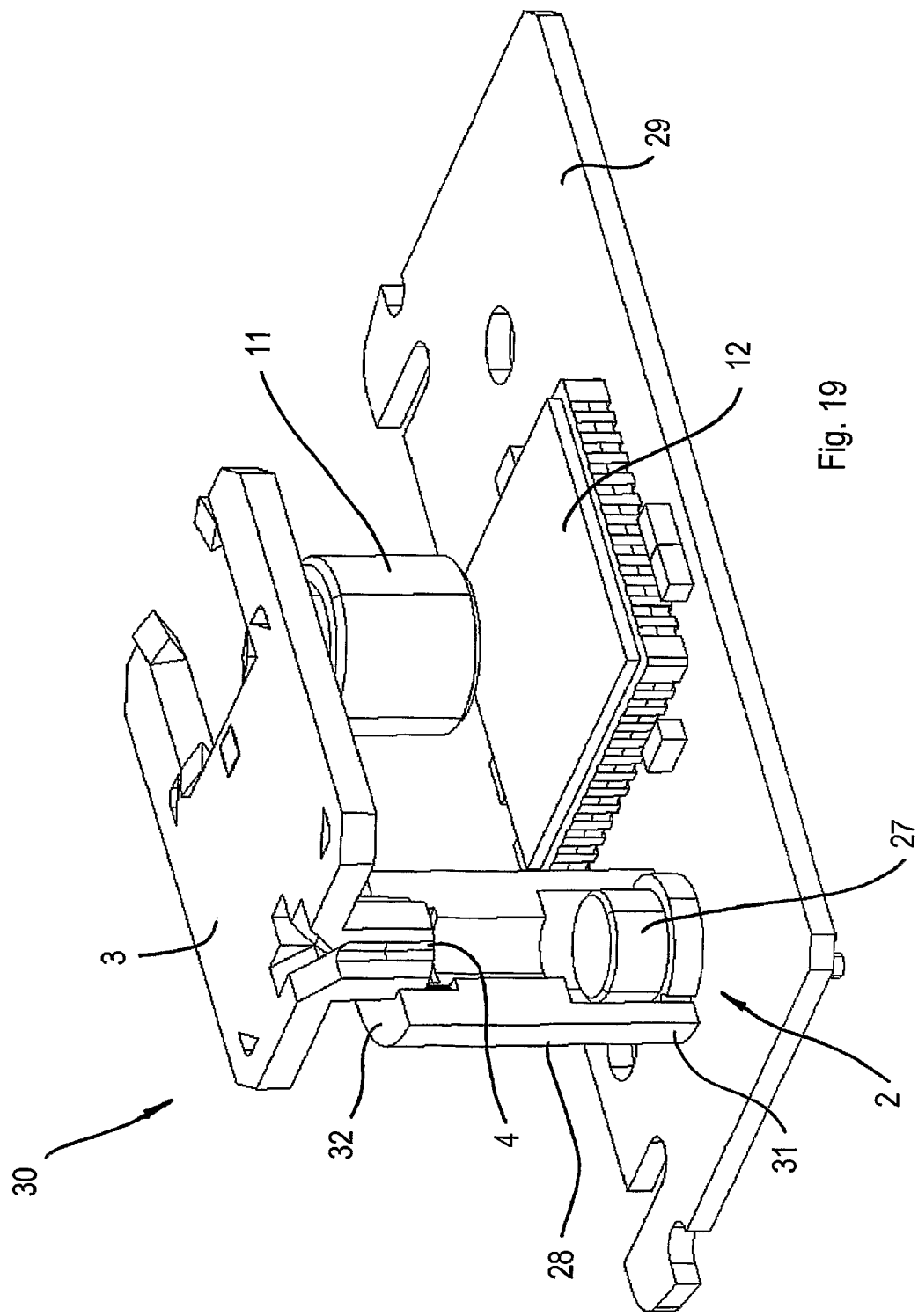
FIG. 19 is a perspective schematic view of an apparatus for reading optical information.

With reference to FIG. 19, interior of an optical information reader 30 is schematically shown. The light guide 3, in the preferred embodiment in FIG. 12, can be fixed inside the reader 30 so as to ensure correct coupling with a laser diode 27 with which the laser 2 is provided. Reophores of laser diode 27 are soldered on a PCB 29 on which the sensor 12 is also mounted, which sensor is in turn contained within an optical chamber not illustrated in FIG. 19. The laser diode 27 is mounted perpendicular to the PCB 29 and correct positioning thereof is ensured by a tubular element 28 which contains the laser diode and is made for example of a plastic material. In particular, the laser diode 27 is inserted in a first end 31 of the tubular element 28. The base of the tubular element 28 is in turn fixed—for example by a pair of screws—to the PCB 29. The tubular element 28 is longer than the laser diode 27: thus it is possible to insert the entrance end 5 of the light guide 3 (the one provided with the collimation lens 4) within a second end 32 of the tubular element 28, opposite the first end 31. The light guide 3 can be held in position with respect to tubular element 28 by means of one or more threaded connecting elements or by a special assembly tool (template). The distance between the laser diode 27 and the lens 4 is such that the laser beam entering the light guide 3 is well collimated.

There are various ways to obtain a fine adjustment of the laser diode 27—lens 4 distance, two of which ways are illustrated below in detail.

In a first way, once the reophores of the laser diode have been soldered to the PCB 29, an assembly tool (template) can be made that is capable of moving the light guide 3 forwards and backwards so as to identify (and afterwards to fix) an optimal laser diode 27—lens 4 distance by checking the collimation of the beam coming out of the guide.

A second way consists of fixing the light guide 3 within the tubular element 28 in such a way that the laser diode 27—lens 4 distance is near the optimal distance (the light guide 3 is thus solidly connected to the tubular element 28). Then an assembly tool (template) is used to move the laser diode 27 backwards and forwards with respect to the PCB 29 by means of the play provided by the length of reophores; once the optimal distance has been found—always by checking the collimation of the laser beam coming out of the light guide—the position of the laser diode 27 on the PCB 29 is fixed by soldering the reophores.

As a consequence, the use of the light guide 3 is advantageous in manufacturing the reader 30: the laser diode 27 is in fact soldered to the same PCB 29 on which the sensor 12 is also mounted (there is no need for a wiring connection) and the collimation of the aiming device can also be carried out using for example one of the two ways described, also in a "remote" manner with respect to the rest of optic chamber. Alternatively, the optical chamber and the tubular element containing the laser diode could be made in a single piece, moulded in plastic (or cast in metal).

The apparatus for reading optical information comprising the device of the invention in the possible embodiments thereof can be housed in a casing that can be held by an operator and thus be portable, or be in a fixed casing for example for reading applications at points of sale (POS) where the operator passes objects in front of a window of the apparatus for reading optical information, and the optical code to be read faces the window.

The reading apparatus can also be fixed at a conveyor belt, or other means for transferring objects, for use in industrial optical information reading applications associated to object in motion even at high speeds. Applications of this type can also be used for control of production lines or recognition, tracing and sorting of objects and packages.

The portable and fixed reading apparatuses can be of the "imager" or the "laser scanner" type.

Furthermore, apart from the capability to read optical information, the aiming device of the invention can be advantageously used in image acquisition apparatuses in general, where it can be useful to indicate clearly the framed zone to an operator, so that the image acquisition apparatus can be positioned correctly.

Apparatuses of this type can be for example micro-cameras lacking a display for observing the framed area, or fixed TV cameras for acquiring images of objects in motion on conveyor belts and for determining their size or shape characteristics or for control and surveillance systems.

What is claimed is:

1. An aiming device for an image acquisition apparatus, comprising a light source and a light guide arranged for receiving a luminous radiation generated by said light source and for providing reference images in an aiming wherein said light guide comprises consecutive portions of light guide defining preferential directions of passage of said luminous radiation, each portion of light guide being inclined with respect to an adjacent portion of light guide,
   wherein said aiming device further comprises a plurality of reflection surfaces, individual ones of the reflection surfaces being interposed between respective pairs of consecutive portions of light guide.

2. The aiming device according to claim 1, wherein each of said reflection surfaces is so shaped as to direct a beam of said luminous radiation coming from a portion of light guide positioned upstream of said reflection surface along a further portion of light guide positioned downstream of said reflection surface.

3. The aiming device according to claim 1, wherein said portions of light guide are substantially rectilinear and each of said reflection surfaces comprises a planar surface inclined by 45° with respect to longitudinal axes of portions of light guide between which said planar surface is interposed.

4. The aiming device according to claim 1, further comprising a collimation lens interposed between said light source and said light guide for collimating said luminous radiation.

5. The aiming device according to claim 4, wherein said collimation lens is fixed to an entrance end of said light guide.

6. The aiming device according to claim 1, wherein a diaphragm is provided upstream of said light guide.

7. The aiming device according to claim 1, wherein said light guide is made of a material which is transparent to said luminous radiation, said luminous radiation being directed along said portions of light guide by means of total internal reflection.

8. The aiming device according to claim 7, wherein said light guide is made of polycarbonate.

9. The aiming device according to claim 1, wherein said light guide comprises a plurality of exit surfaces through which beams of said luminous radiation intended to form said reference images are emitted and further reflection surfaces cooperating with said exit surfaces.

10. The aiming device according to claim 9, wherein said further reflection surfaces and said exit surfaces are mutually oriented in such a way that said beams comes out of said light guide substantially perpendicular with respect to said exit surfaces.

11. The aiming device according to claim 1, wherein said light guide is a hollow light guide provided with lateral walls made of a material that is not transparent to said luminous radiation.

12. The aiming device according to claim 1, wherein said light guide comprises optically inactive parts arranged to improve mechanical properties of said light guide.

13. The aiming device according to claim 1, wherein said light guide comprises a plurality of branches each arranged to generate a reference image.

14. The aiming device according to claim 13, wherein said light guide comprises four branches so shaped as to generate reference images defining vertices of a quadrilateral.

15. The aiming device according to claim 14, wherein said four branches are shaped so that four luminous beams coming out of said four branches intersect each other at a point situated on an optical axis of said image acquisition apparatus.

16. The aiming device according to claim 15, wherein said optical axis is the optical axis of a receiving objective of said image acquisition apparatus.

17. The aiming device according to claim 14, wherein said four branches are shaped so that four luminous beams coming out of said four branches have no point of intersection.

18. The aiming device according to claim 14, wherein said four branches are shaped so that four luminous beams coming out of said four branches intersect each other in pairs.

19. The aiming device according to claim 14, further comprising a further branch so shaped as to generate a further reference image at a central zone of said quadrilateral.

20. The aiming device according to claim 19, wherein said further branch is shaped so that a further laser beam coming out of said further branch intersects an optical axis of said image acquisition apparatus.

21. The aiming device according to claim 13, wherein said branches have a rectangular or square cross-section.

22. The aiming device according to claim 1, wherein a tubular element is interposed between said light source and said light guide, said luminous radiation generated by said light source reaching said light guide through said tubular element.

23. The aiming device according to claim 22, wherein said tubular element comprises a first end arranged for receiving an emission portion of said light source and a further end arranged for receiving an entrance zone of said light guide through which said luminous radiation enters said light guide.

24. The aiming device according to claim 1, wherein said light source comprises a single laser source (2).

25. The aiming device according to claim 1, wherein a beam shaper is provided upstream of said light guide.

26. An aiming device for an image acquisition apparatus, comprising a light source and a light guide arranged for receiving a luminous radiation generated by said light source and for providing a plurality of reference images in an aiming zone, wherein said light guide comprises at least three branches each of which emits a luminous beam arranged for generating a corresponding reference image of said plurality of reference images,
   wherein said light guide comprises four branches so shaped as to generate reference images defining vertices of a quadrilateral.

27. The aiming device according to claim 26, wherein said four branches are shaped so that four luminous beams coming out of said four branches intersect each other at a point situated on an optical axis of said image acquisition apparatus.

28. The aiming device according to claim 26, wherein said four branches are shaped so that four luminous beams coming out of said four branches have no point of intersection.

29. The aiming device according to claim 26, wherein said four branches are shaped so that four luminous beams coming out of said four branches intersect each other in pairs.

30. The aiming device according to claim 26, further comprising a further branch so shaped as to generate a further reference image at a central zone of said quadrilateral.

31. The aiming device according to claim 30, wherein said further branch is shaped so that a further laser beam coining out of said further branch intersects an optical axis of said image acquisition apparatus.

32. The aiming device according to claim 31, wherein said optical axis is the optical axis of a receiving objective of said image acquisition apparatus.

33. The aiming device according to claim 26, further comprising a collimation lens interposed between said light source and said light guide for collimating said luminous radiation.

34. The aiming device according to claim 26, wherein a diaphragm is provided upstream of said light guide.

35. The aiming device according to claim 26, wherein said light guide is made of material transparent to said luminous radiation, said luminous radiation being directed along said at least three branches by means of total internal reflection.

36. The aiming device according to claim 26, wherein said light guide comprises a plurality of exit surfaces through which beams of said luminous radiation intended to form said reference images is emitted and further reflection surfaces cooperating with said exit surfaces.

37. The aiming device according to claim 36, wherein said further reflection surfaces and said exit surfaces are mutually oriented in such a way that said beams comes out of said light guide substantially perpendicular to said exit surfaces.

38. The aiming device according to claim 26, wherein said light guide comprises optically inactive parts arranged for improving mechanical properties of said light guide.

39. The aiming device according to claim 26, wherein a tubular element is interposed between said light source and said light guide, said luminous radiation generated by said light source reaching said light guide through said tubular element.

40. The aiming device according to claim 26, wherein said light source comprises a single laser source.

41. The aiming device according to claim 26, wherein a beam shaper is provided upstream of said light guide.

42. An image acquisition apparatus comprising an aiming device according to claim 1.

43. The image acquisition apparatus according to claim 42, wherein said apparatus is an apparatus for reading optical information.

44. The image acquisition apparatus according to claim 43, wherein said apparatus is a portable apparatus.

45. The image acquisition apparatus according to claim 43, wherein said apparatus is a fixed apparatus.

46. An aiming device for an image acquisition apparatus, comprising a light source and a light guide arranged for receiving a luminous radiation generated by said light source and for providing reference images in an aiming zone, wherein said light guide comprises consecutive portions of light guide defining preferential directions of passage of said luminous radiation, each portion of light guide being inclined with respect to an adjacent portion of light guide, wherein said light guide comprises a plurality of branches each arranged to generate a reference image.

47. An aiming device for an image acquisition apparatus, comprising a light source and a light guide arranged for receiving a luminous radiation generated by said light source and for providing reference images in an aiming zone, wherein said light guide comprises consecutive portions of light guide defining preferential directions of passage of said luminous radiation, each portion of light guide being inclined with respect to an adjacent portion of light guide, wherein said aiming device further comprises a plurality of reflection surfaces, individual ones of the reflection surfaces being interposed between respective pairs of consecutive portions of light guide, said aiming device further comprising a collimation lens interposed between said light source and said light guide for collimating said luminous radiation; said collimated luminous radiation traversing each branch of light guide remaining substantially parallel to a longitudinal axis of the branch.

\* \* \* \* \*

UNITED STATES PATENT AND TRADEMARK OFFICE
CERTIFICATE OF CORRECTION

| | |
|---|---|
| PATENT NO. | : 8,181,877 B2 |
| APPLICATION NO. | : 12/519087 |
| DATED | : May 22, 2012 |
| INVENTOR(S) | : Stefano Barsotti |

It is certified that error appears in the above-identified patent and that said Letters Patent is hereby corrected as shown below:

Column 13, line 11, delete "coining" and insert therefor --coming--.

Signed and Sealed this
Fourteenth Day of August, 2012

David J. Kappos
*Director of the United States Patent and Trademark Office*